(12) United States Patent
Lee et al.

(10) Patent No.: US 9,377,662 B2
(45) Date of Patent: Jun. 28, 2016

(54) ELECTROCHROMIC DEVICE INCLUDING CARBON-BASED MATERIAL AND VIOLOGEN-BASED COMPOUND, AND METHOD FOR PRODUCING THE SAME

(71) Applicant: RESEARCH AND BUSINESS FOUNDATION SUNGKYUNKWAN UNIVERSITY, Suwon-si (KR)

(72) Inventors: Hyoyoung Lee, Suwon-si (KR); Eunhee Hwang, Suwon-si (KR); Sohyeon Seo, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/817,491

(22) Filed: Aug. 4, 2015

(65) Prior Publication Data

US 2016/0033839 A1 Feb. 4, 2016

(30) Foreign Application Priority Data

Aug. 4, 2014 (KR) .......................... 10-2014-0099997

(51) Int. Cl.
*G02F 1/153* (2006.01)
*G02F 1/15* (2006.01)

(52) U.S. Cl.
CPC .................................... *G02F 1/1521* (2013.01)

(58) Field of Classification Search
CPC ............................ G02F 1/1521; G02F 1/1523
USPC ........... 359/265–275, 900; 345/105; 252/583, 252/582
See application file for complete search history.

(56) References Cited

U.S. PATENT DOCUMENTS 8,089,682 B2 * 1/2012 Noh ......................... C09K 9/02
359/273

FOREIGN PATENT DOCUMENTS

| JP | 2011-257659 A | 12/2011 |
|----|---------------|---------|
| KR | 10-2007-0070792 A | 7/2007 |
| KR | 10-2012-0035834 A | 4/2012 |
| KR | 10-2012-0057487 A | 6/2012 |
| KR | 10-2014-0001502 A | 1/2014 |

OTHER PUBLICATIONS

Korean Office Action issued Jan. 20, 2015 in counterpart Korean Application No. KR 10-2014-0099997 (10 pages, in Korean, with English language translation).

(Continued)

*Primary Examiner* — Tuyen Tra
(74) *Attorney, Agent, or Firm* — NSIP Law

(57) ABSTRACT

The following description relates to an electrochromic device including a carbon-based material and a viologen-based compound, a method for producing the electrochromic device, and use thereof. There is provided the electrochromic device including an active layer arranged between a first electrode and a second electrode, in which the active layer includes a carbon-based material and a viologen-based compound, and the carbon-based material and the viologen-based compound are bonded to each other through a non-covalent interaction.

13 Claims, 34 Drawing Sheets

(56) References Cited

OTHER PUBLICATIONS

Korean Office Action issued May 14, 2015 in counterpart Korean Application No. KR 10-2014-0099997 (5 pages, in Korean, with English language translation).

Hwang, Eunhee, et al. "An Electrolyte-Free Flexible Electrochromic Device Using Electrostatically Strong Graphene Quantum Dot-Viologen Nanocomposites." Advanced Materials 26.30 (2014): (16 pages).

* cited by examiner

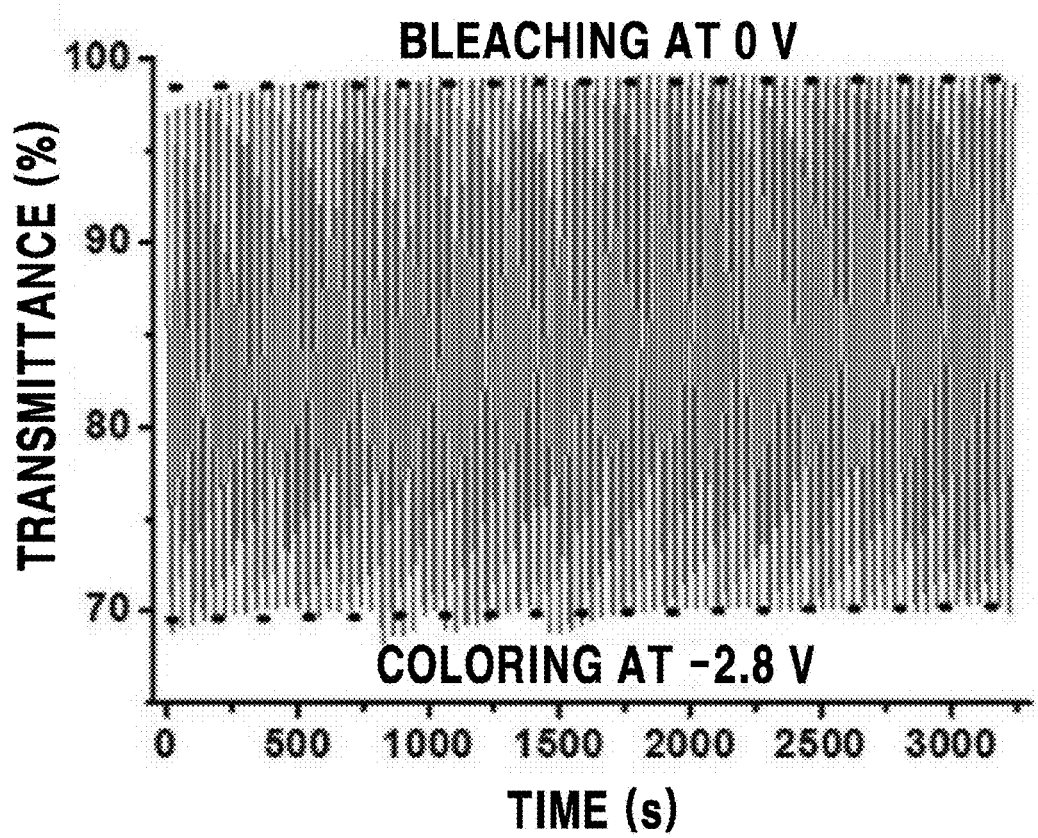

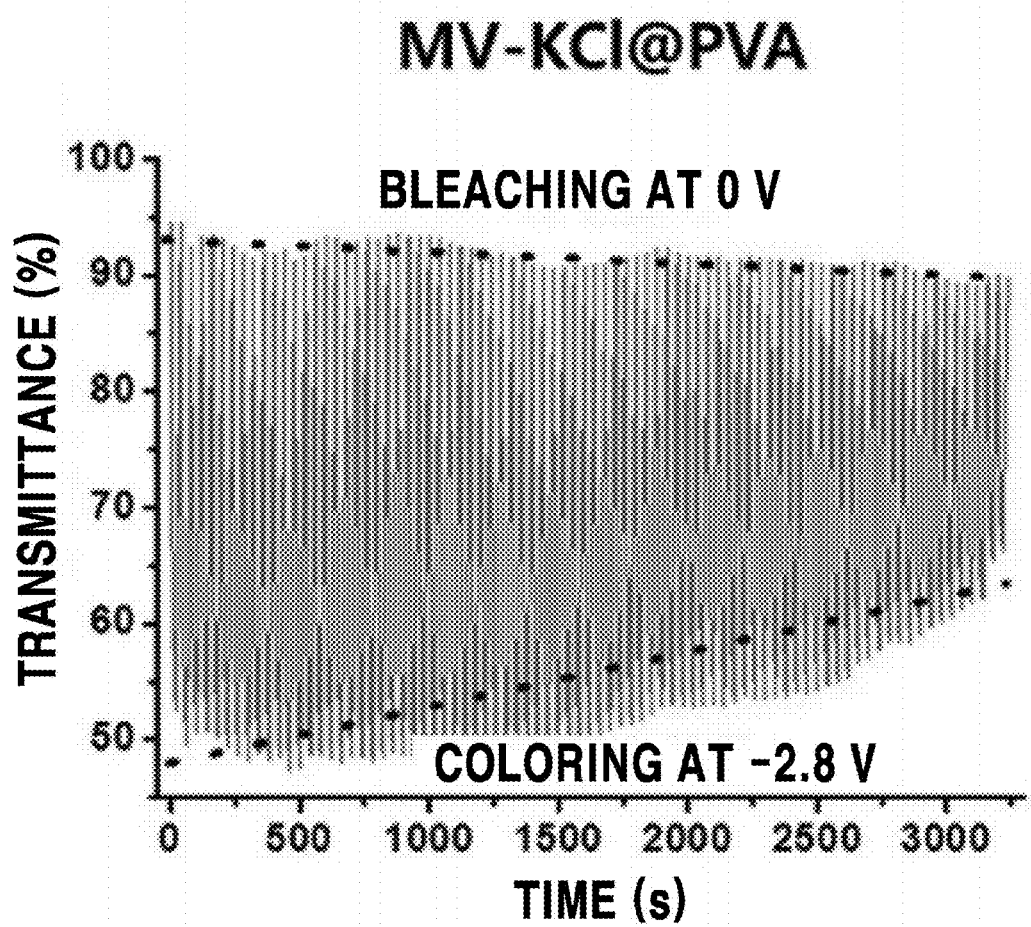

ELECTROCHROMIC DEVICE INCLUDING CARBON-BASED MATERIAL AND VIOLOGEN-BASED COMPOUND, AND METHOD FOR PRODUCING THE SAME

CROSS-REFERENCE TO RELATED APPLICATION

This application claims the benefit under 35 USC 119(a) of Korean Patent Application No. 10-2014-0099997 filed on Aug. 4, 2014, in the Korean Intellectual Property Office, the entire disclosure of which is incorporated herein by reference for all purposes.

BACKGROUND

1. Field

The following description relates to an electrochromic device including a carbon-based material and a viologen-based compound, a method for producing the electrochromic device, and use thereof.

2. Description of Related Art

Recent research efforts on electrochromic behaviors used in electro-optic applications have focused on developing novel electrochromes and advancing the forms of devices. An important factor in enhancing the performance of electrochromic devices (ECDs) is to greatly increase the electrochrome stability, allowing them to undergo many reversible color changes under applied voltages, and thus, to remain operable over long periods of use. Inorganic electrochromic devices composed of metal oxides have achieved enhanced device performance through structural modifications of electrochromes, development of new dopants, and chemical modifications to the electrode material. For future ECDs, nonetheless, further developments of organic electrochromes are in demand to allow devices to be highly flexible and wearable. However, until now, there have been only a few studies on polymer electrochromes for use in organic electrochromic devices, due to lack of organic monomers that can demonstrate long-term performance under an electric voltage. Therefore, inexpensive, long-lasting, and easily processable organic electrochromes should be investigated intensively for future electro-optic devices.

In an ECD, an electrolyte supports the electrochromic reactions between the two electrodes. Generally, electrolytes are composed of liquid solvents and any of a variety of ionic salts. Metal cations are often combined with a volatile organic solvent in the electrolyte layer, which serves as an ion conducting medium. However, the use of such electrolytes with electrochromes in an ECD system poses the risk of decomposing the metal-ion-containing electrochromes at high voltages, leading to poor ECD stability and eventual performance degradation. Therefore, the durability and the performance of the electrolytes used in ECD systems should be improved to enable future applications such as electrochromic smart windows, displays, and mirrors. Furthermore, in the electrochromic systems, directly combining an electrochromic material with polymer electrolytes or electrodes has been developed. For example, an electrochromic material directly bonded to an electrolyte may produce a somewhat stable electrochromic platform. However, the highly dense polymer used in this platform may decrease its switching properties and coloration efficiency, and also may make the platform unsuitable for flexible applications. In order to realize various electro-optic devices, therefore, it will be necessary to improve the structural combinations of electrolytes, electrochromes, and electrodes. Success in the improvement will enable not only highly stable and structurally simplified ECDs but also highly demanded flexible ECDs.

Meanwhile, Korean Patent Application Publication Nos. 10-2007-0070792 and 10-2014-0001502 describe an electrochromic device including electrolyte.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure provides an electrochromic device including an active layer, in which the active layer includes a carbon-based material and a viologen-based compound, and the carbon-based material and the viologen-based compound are bonded to each other through non-covalent interaction; a method for producing the electrochromic device; and a flexible display, a smart window, and an electrochromic mirror, which include the electrochromic device.

However, the problems sought to be solved by the present disclosure are not limited to the above description, and other problems can be clearly understood by those skilled in the art from the following description.

A first aspect of the present disclosure, there is provided an electrochromic device, including: an active layer arranged between a first electrode and a second electrode; in which the active layer includes a carbon-based material and a viologen-based compound, and the carbon-based material and the viologen-based compound are bonded to each other through a non-covalent interaction.

The carbon-based material may include a member selected from the group consisting of graphene, a graphene quantum dot, a graphene oxide, a reduced graphene oxide, a carbon nanotube (CNT), and combinations thereof.

The electrochromic device may further include an electrolyte coated on one of the first electrode and the second electrode.

The active layer may further include a polymer material that is dissolved in water or an organic solvent.

The polymer material may include a member selected from the group consisting of polyvinyl alcohol (PVA), polymethyl methacrylate (PMMA), polyvinyl chloride (PVC), polyethylene terephthalate (PET), polyethylene naphthalate (PEN), polyethersulfone (PES), polycarbonate (PC), polypropylene (PP), polyethylene (PE), ethylene vinyl alcohol (EVA), polyethylene oxide (PEO), polypropylene oxide (PPO), polyethyleneimine (PEI), polydimethylsiloxane (PDMS), polyvinylidene fluoride (PVDF), and combinations thereof.

The non-covalent interaction may include an electrostatic bonding, a π-π stacking bonding, or a cation-π bonding.

The electrochromic device may have flexibility.

A second aspect of the present disclosure, there is provided a flexible display, comprising the electrochromic device according to the first aspect.

A third aspect of the present disclosure, a smart window, comprising the electrochromic device according to the first aspect.

A fourth aspect of the present disclosure, an electrochromic mirror, comprising the electrochromic device according to the first aspect.

A fifth aspect of the present disclosure, there is provided a method for producing an electrochromic device, including: forming an active layer between a first electrode and a second electrode, in which the active layer is formed by a non-covalent interaction between a carbon-based material and a viologen-based compound.

The carbon-based material may include a member selected from the group consisting of graphene, a graphene quantum dot, a graphene oxide, a reduced graphene oxide, a carbon nanotube, and combinations thereof.

The method may further include coating electrolyte on one of the first electrode and the second electrode.

The non-covalent interaction may include interaction by an electrostatic bonding, a π-π stacking bonding, or a cation-π bonding.

The active layer may be formed in a gel form.

According to an embodiment of the present disclosure, the electrochromic device produced by the method of the present disclosure can show very stable switching performance, high durability under repeated application of operating voltage, and thermal stability. Thus, the electrochromic device according to the embodiments can show stable performance even in a high temperature or bent state.

According to an embodiment of the present disclosure, the electrochromic device according to the embodiments can show a stable electrochromic property even when it includes no electrolyte, as well as when it includes electrolyte. As the electrochromic device includes no electrolyte, the structure of the electrochromic device can be simplified. Further, the performance of the electrolyte-free flexible electrochromic device, which is based on the viologen-based compound-carbon-based material electrochromic device, can be stabilized by strong inter-molecular interaction within a viologen-based compound-carbon-based material nanocomposite.

According to an embodiment of the present disclosure, since the electrochromic device does not require electrolyte between electrodes and has flexibility, it can be used for flexible displays, smart windows, and electrochromic mirrors.

According to an embodiment of the present disclosure, since the electrochromic device can also be driven even when electrolyte is present between electrodes, and show the electrochromic property, irrespective of the presence of electrolyte, it can be applied to various electrochromic devices.

BRIEF DESCRIPTION OF THE DRAWINGS

FIG. 4A shows voltage-controlled transmittance change by voltage switching between 0 V (bleached state) and –2.8 V (colored state) for 50 mM $MV^{2+}$ in an ECD at 550 nm, and the ECD of ITO-on-glass electrodes were prepared with 8 mg $mL^{-1}$ GQD in polyvinyl alcohol) (PVA) [MV-GQD@PVA], in an Example of the present disclosure.

FIG. 4B shows voltage-controlled transmittance change by voltage switching between 0 V (bleached state) and –2.8 V (colored state) for 50 mM $MV^{2+}$ in an ECD at 550 nm, and the ECD of ITO-on-glass electrodes were prepared with 0.1 M KCl in PVA [MV-KCl@PVA], in an Example of the present disclosure.

DETAILED DESCRIPTION

Figure 1:
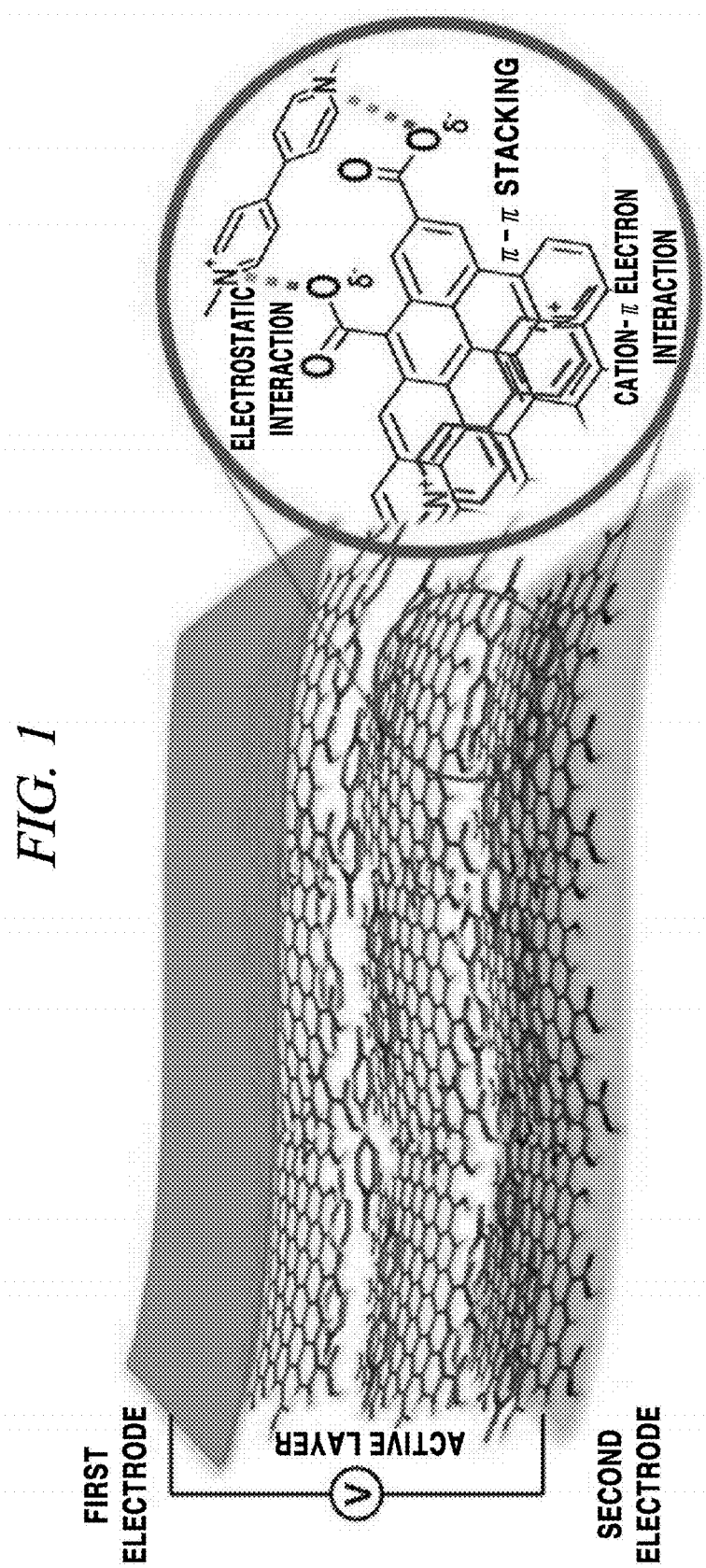
FIG. 1 is an illustration of an electrolyte-free flexible methyl viologen-graphene quantum dot ($MV^{2+}$-GQD) electrochromic device, in an Example of the present disclosure.

Hereinafter, embodiments and Examples of the present disclosure will be described in detail with reference to the accompanying drawings so that inventive concept may be readily implemented by those skilled in the art. However, it is to be noted that the present disclosure is not limited to the embodiments and Examples but can be realized in various other ways. In the drawings, certain parts not directly relevant to the description are omitted to enhance the clarity of the drawings, and like reference numerals denote like parts throughout the whole document.

Throughout the whole document of the present disclosure, the terms "connected to" or "coupled to" are used to designate a connection or coupling of one element to another element and include both a case where an element is "directly connected or coupled to" another element and a case where an element is "electronically connected or coupled to" another element via still another element.

Throughout the whole document of the present disclosure, the term "on" that is used to designate a position of one element with respect to another element includes both a case that the one element is adjacent to the another element and a case that any other element exists between these two elements.

Throughout the whole document of the present disclosure, the term "comprises or includes" and/or "comprising or including" used in the document means that one or more other components, steps, operations, and/or the existence or addition of elements are not excluded in addition to the described components, steps, operations and/or elements.

The terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party.

Throughout the whole document of the present disclosure, the term "step of" does not mean "step for."

Throughout the whole document of the present disclosure, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Throughout the whole document of the present disclosure, the description "A and/or B" means "A or B, or A and B."

Throughout the whole document of the present disclosure, the terms "electrochromic device (ECD)" mean a device using the principle that color of a material changes when an electric signal is applied from the outside as a result of an electrochemical oxidation-reduction reaction.

Throughout the whole document of the present disclosure, the terms "quantum dot" mean a nano-size material having a band gap due to a quantum confinement effect.

Throughout the whole document of the present disclosure, the term "graphene" means that multiple carbon atoms are bonded to one another through covalent bond, thereby forming polycyclic aromatic molecules, and the carbon atoms bonded through the covalent bond form a six (6) circular ring as a basic repeat unit, but may further include five (5) and/or seven (7) circular rings. Accordingly, a sheet formed of the graphene appears to be a monolayer of the covalently bonded carbon atoms, but may not be limited thereto. The sheet formed of the graphene may have various structures, and the structures may vary depending on a content of the 5 and/or 7 circular rings that may be contained in the graphene. Furthermore, if the sheet formed of the graphene is a monolayer, it may be stacked on one another thereby forming multiple layers, and a side end part of the graphene sheet may be saturated with hydrogen atoms, but may not be limited thereto.

Throughout the whole document of the present disclosure, the terms "electrolyte" mean a composition having one or more liquid solvents and any of a variety of ionic salt(s).

Embodiments of the present disclosure have been described in detail, but the present disclosure may not be limited to the embodiments.

A first aspect of the present disclosure provides an electrochromic device including an active layer arranged between a first electrode and a second electrode; in which the active layer includes a carbon-based material and a viologen-based compound, and the carbon-based material and the viologen-based compound are bonded to each other through a non-covalent interaction.

In an embodiment of the present disclosure, the carbon-based material may include a member selected from the group consisting of graphene, a graphene quantum dot (GQD), a graphene oxide (GO), a reduced graphene oxide (rGO), a carbon nanotube (CNT), and combinations thereof, but is not limited thereto.

In an embodiment of the present disclosure, the electrochromic device may further include electrolyte coated on the first electrode and the second electrode, but is not limited thereto.

In an embodiment of the present disclosure, the active layer may further include a polymer material that can be dissolved in water or an organic solvent, but is not limited thereto.

In an embodiment of the present disclosure, the polymer material may include a member selected from the group consisting of polyvinyl alcohol (PVA), polymethyl methacrylate (PMMA), polyvinyl chloride (PVC), polyethylene terephthalate (PET), polyethylene naphthalate (PEN), polyethersulfone (PES), polycarbonate (PC), polypropylene (PP), polyethylene (PE), ethylene vinyl alcohol (EVA), polyethylene oxide (PEO), polypropylene oxide (PPO), polyethyleneimine (PEI), polydimethylsiloxane (PDMS), polyvinylidene fluoride (PVDF), and combinations thereof, but is not limited thereto.

In an embodiment of the present disclosure, the viologen-based compound is a material that changes its color while an oxidation-reduction reaction occurs due to an electrical stimulation. For example, the viologen-based compound is a compound including two (2) or more pyridinium derivatives in its molecular structure, and may be a compound in the reduced state. In addition, the compound in the reduced state may be a compound, in which nitrogen within a ring of at least one pyridinium derivative is reduced. The viologen-based compound in the reduced state was affecting with a non-polar solvent, and the viologen-based compound in the oxidized state was affecting with water. Since the reduced viologen-based compound is more unstable than its initial state, it may give electrons to peripheries so as to change into the stable state. When the viologen-based compound is intentionally reduced, the reduced viologen-based compound reacts with peripheral graphene and spontaneously supplies electrons to the graphene so as to change into its initial stable state.

The compound including two or more pyridinium derivatives in the molecular structure has a low redox potential and may be intentionally reduced so as to be in the relatively unstable state. Accordingly, a compound that is reduced to be in the unstable state may spontaneously supply electrons to graphene so as to be in the relatively stable state. If a resonance structure has been inserted as a bridge between the two or more pyridinium derivatives within the molecular structure of the compound, the compound in the reduced state may be in the more unstable state, and thus, the compound may more spontaneously supply electrons to graphene. For example, the compound including the two or more pyridinium derivatives may be a viologen-based compound including bipyridinium derivatives, but is not limited thereto.

In an embodiment of the present disclosure, the viologen-based compound is chemical species resulting from modification of a 4-ammonium salt of 4,4'-bipyridyl, and may include a compound containing diquaternary ammonium ions, but is not limited thereto. Polarity of the viologen-based compound may change depending on an oxidation-reduction reaction. For example, N,N'-dimethyl-4,4'-bipyridinium may be methyl viologen ($MV^{2+}$), but is not limited thereto.

For example, the viologen-based compound may be 1,1'-dibenzyl-4,4'-bipyridinium dichloride (BV), methyl viologen dichloride hydrate (MV), ethyl viologen diperchlorate (EV), 1,1'-dioctadecyl-4,4'-bipyridinium dibromide (DBDB) or others, but is not limited thereto.

In an embodiment of the present disclosure, the viologen-based compound may include a conjugatable molecular structure between two pyridine structures, but is not limited thereto. That is, in the viologen-based compound, when pyridines are present at both terminals of the compound, and a conjugatable structure is included as an intermediate bridge, the pyridine of each of the terminals may be zerovalent. When the conjugatable structure is included, the viologen-based compound may more spontaneously supply electrons to graphene in the state that it is reduced. The viologen-based compound, in which the conjugatable molecular structure is included between the pyridinium structures, may be called an extended viologen, but is not limited thereto. The conjugatable structure in the extended viologen may be, for example, aryl, alkenyl, alkynyl or others, but is not limited thereto. For example, the molecular structure may be phenyl, ethenyl, thiophenyl or others, and specifically, may include di-octyl bis(4-pyridyl)biphenyl viologen and others, but is not limited thereto.

In an embodiment of the present disclosure, the noncovalent interaction may include an electrostatic bonding, a $\pi$-$\pi$ stacking bonding, or a cation-$\pi$ bonding, but is not limited thereto.

In an embodiment of the present disclosure, the electrochromic device may or may not include electrolyte. The electrochromic device is a device using an electrochrome that changes its color due to an external electrical signal; for example, the electrochromic device may be used for adjusting light transmittance and reflectance of building window glass or a car room mirror, and may also have an infrared ray blocking effect, but the present disclosure is not limited thereto.

In an embodiment of the present disclosure, the electrochromic device may have flexibility, but is not limited thereto. In addition, the electrochromic device can show a stable and excellent electrochromic property even in the bent state.

A second aspect of the present disclosure provides a flexible display including the elecrochromic device according to the first aspect.

All the descriptions of the first aspect of the present disclosure may be applied to the second aspect of the present disclosure.

A third aspect of the present disclosure provides a smart window including the electrochromic device according to the first aspect.

All the descriptions of the first and second aspects of the present disclosure may be applied to the third aspect of the present disclosure.

A fourth aspect of the present disclosure provides an electrochromic mirror including the electrochromic device according to the first aspect.

All the descriptions of the first to third aspects of the present disclosure may be applied to the fourth aspect of the present disclosure.

A fifth aspect of the present disclosure provides a method for producing an electrochromic device, which includes forming an active layer between a first electrode and a second electrode, and in which the active layer is formed by a non-covalent interaction between a carbon-based material and a viologen-based compound.

All the descriptions of the first to fourth aspects of the present disclosure may be applied to the fifth aspect of the present disclosure.

In an embodiment of the present disclosure, the carbon-based material may include a material composed of graphene, a graphene quantum dot (GQD), a graphene oxide (GO), a reduced graphene oxide (rGO), a carbon nanotube (CNT) or a combination thereof, but is not limited thereto.

In an embodiment of the present disclosure, the method for producing the electrochromic device may further include coating electrolyte on the first electrode and the second electrode, but is not limited thereto.

In an embodiment of the present disclosure, the non-covalent interaction may include interaction by an electrostatic bonding, a π-π stacking bonding, or a cation-π electron bonding, but is not limited thereto.

In an embodiment of the present disclosure, the active layer may be formed in a gel form, but is not limited thereto. The active layer may be produced by combining the graphene quantum dot and the viologen-based compound with each other in a solvent (e.g., water or an organic solvent), but is not limited thereto.

Hereinafter, the present disclosure is described in more detail with reference to Examples, but is not limited to the Examples.

EXAMPLES

Preparation of Graphene Quantum Dots (GQDs)

In this Example, GQD was synthesized from graphene oxide (GO). In brief, GO was dissolved in dimethylformamide (DMF) to have a concentration of 5 mg/mL. This GO/DMF solution was ultrasonicated for 5 h (120 W), and then, heated at 200° C. in a Teflon-lined autoclave (300 mL) for 12 h. The reactor was cooled, and then, the solution was filtered to remove undispersed reduced GO, yielding a transparent brown solution of GQDs. The GQDs were purified by silica column chromatography, and characterized by X-ray photoelectron spectroscopy (XPS; ESCA 2000, VG Microtech), atomic force microscopy (AFM; SPA 300, Seiko Instruments), UV-vis spectroscopy (Optizen Pop, Mecasys), and transmission electron microscopy (TEM; JEOL JEM-2100F).

Fabrication of Electrochromic Devices

N,N'-dimethyl-4,4'-bipyridinium dichloride hydrate was used as received without further purification (Aldrich). GQD solutions of various concentrations were prepared to investigate the feasibility of using GQD in $MV^{2+}$-GQD mixtures. $MV^{2+}$-GQD solutions were prepared by mixing $MV^{2+}$ and GQD in water, followed by adding 10 wt % aqueous polyvinyl alcohol) (PVA) (where the final content would be 5 wt %) with stirring for 12 h. Two ITO-on-glass electrodes (20 Ω/□) were sandwiched and surrounded completely to form a seal using Surlyn tape. A PVA gel of $MV^{2+}$-GQD was then injected between the two electrodes using a syringe. Flexible ECDs were fabricated by inserting a scotch tape spacer between the ITO-on-PET electrodes (20Ω/□ to 60Ω/□), followed by injecting a PVA gel of $MV^{2+}$-GQD between the two electrodes.

Characterization $MV^{2+}$-GQD was characterized using photoluminescence spectroscopy (Cary Eclipse fluorescence spectrophotometer, Agilent Technologies Inc.), FTIR spectroscopy (Bruker IFS-66/S), zeta potential measurement (ELSZ-2, Otsuka Electronics Korea Co. Ltd.), and XPS. Electrochromic performance was evaluated by cyclic voltammetry, UV-vis spectroscopy, chronoamperometry, and spectro-electrochemistry. Electrochemical measurements were carried out using a potentiostat (CH Instruments CHI 600). Cyclic voltammetry was carried out using three (3) electrode systems after nitrogen bubbling of the solution. The following electrodes were used: ITO-on-glass as the working electrode, an Ag/AgCl (sat. KCl) electrode as the reference electrode, and a Pt electrode as the counter electrode.

The following Example provided a new electrolyte-free flexible electrochromic system, in which the electrochrome is combined with a conductive nanomaterial and stabilized through strong intermolecular forces (e.g., electrostatic interactions, π-π stacking interactions, or cation-π electron interactions). The resulting devices exhibited excellent operational stability in repeatable voltage switching between the colored state and the bleached state, and were suitable for the fabrication of flexible ECD devices. The new electrochrome in this Example was substantially composed of the electrochromic N,N'-dimethyl-4,4'-bipyridinium (abbreviated as $MV^{2+}$) (methyl viologen) as a cation, and conductive graphene quantum dots (GQDs) as an anion. The ions formed strong static electricity and π-π interactions and were adhered to each other well. As a result, an ECD composed of GQDs incorporating $MV^{2+}$ ($MV^{2+}$-GQD) showed stable electrochromic performance without electrolyte. FIG. 1 illustrates the device structure of an electrochromic cell containing only GQDs and $MV^{2+}$. $MV^{2+}$ molecules could be electrostatically bonded to oxygen functional groups of GQDs, and it is expected that two benzene rings of $MV^{2+}$ can be structurally attached to a GQD via face-to-face stacking, and $MV^{2+}$ can accept electrons from the GQD (i.e., the donor-acceptor interactions between the π-electron deficient bipyridinium units and the π-electron rich GQD sheets). For ECD applications in harsh environments, the thermal stability of $MV^{2+}$-GQD ECD was tested, and $MV^{2+}$-GQD ECD was subject to mechanical stress tests. In this Example, it was found that the $MV^{2+}$-GQD ECD was highly operationally stable due to the stability of GQD against heat treatment and bending stress. This Example is the first report of the electrolyte-free flexible ECD that uses a combination of GQDs and $MV^{2+}$. The results of this Example can provide a guideline for stability improvements and design simplification for future flexible ECDs.

Figure 2A:
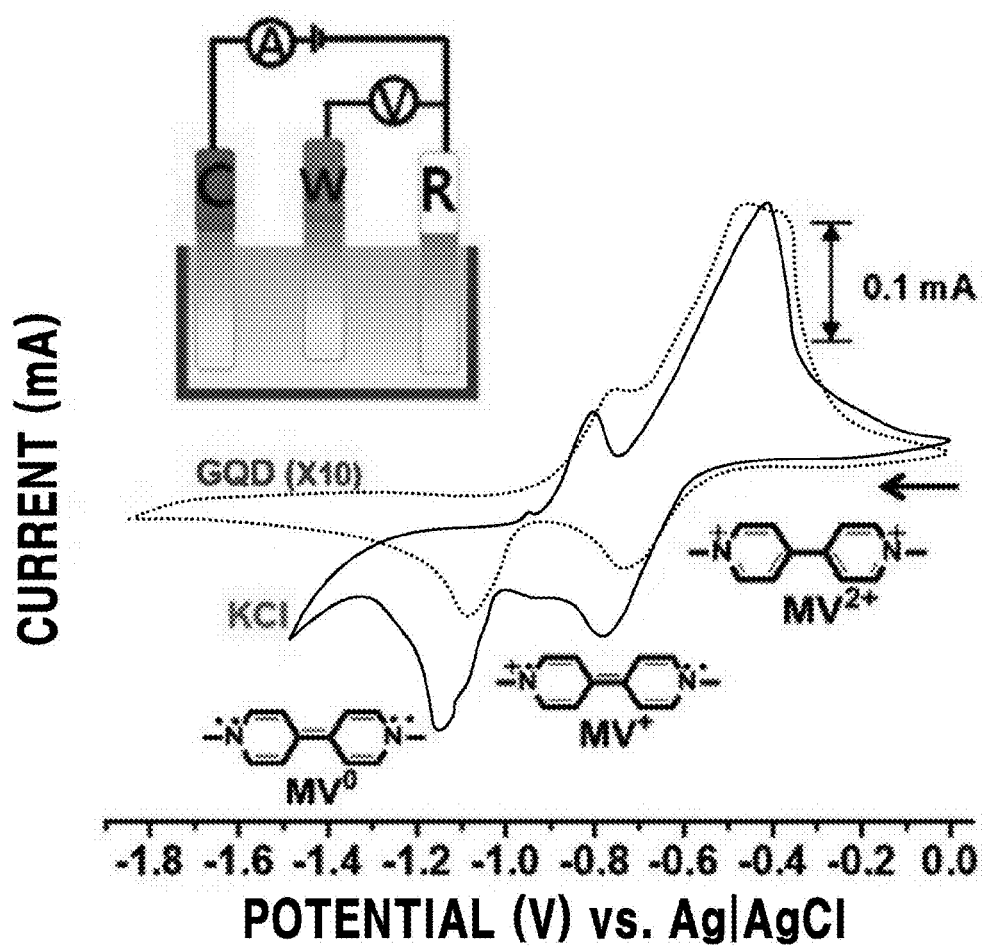
FIG. 2A illustrates cyclic voltammetry (CV) of 5 mM $MV^{2+}$ at an indium tin oxide (ITO) electrode, in an aqueous solution containing a 8 mg $mL^{-1}$ graphene quantum dot (GQD) (dotted line) or 0.1 M KCl (solid line) at a scan rate of 100 mV $s^{-1}$, in an Example of the present disclosure, and the inset shows a three-electrode cell composed of a working electrode (W), a counter electrode (C), and a reference electrode (R).

The electrochemical two-electron transfer steps of $MV^{2+}$ were proved by cyclic voltammetry in a GQD solution without an electrolyte, as well as in a well-known electrolyte solution of KCl (FIG. 2A) in a three-electrode electrochemical cell. Cyclic voltammetry was carried out using an indium tin oxide (ITO) electrode on glass as a working electrode. The voltage was swept between −1.8 and 0 V. The two different solutions were prepared by mixing 5 mM $MV^{2+}$ with each of 8 mg/mL GQDs (see the Example and FIGS. 8A~8D) and 0.1 M KCl in deionized (DI) water. The two redox peaks in a typical cyclic voltammetry (CV) of a trace of $MV^{2+}$-GQD corresponding to $MV^{2+}/MV^{+\bullet}$ and $MV^{+\bullet}/MV^0$ (dotted in FIG. 2A) showed the repeated color change from colorless ($MV^{2+}$) to purple ($MV^{+\bullet}$) species. The peaks exactly matched the peaks of $MV^{2+}$ in a KCl electrolyte (solid in FIG. 2A), illustrating the typical electrochemical behavior of $MV^{2+}$ in electrolyte solutions. GQDs are expected to act as an electron transfer medium to facilitate oxidation or reduction of other organic species, and GQDs were stable enough to perform electrolyte-like charge transfer in the solution.

Figure 2B:
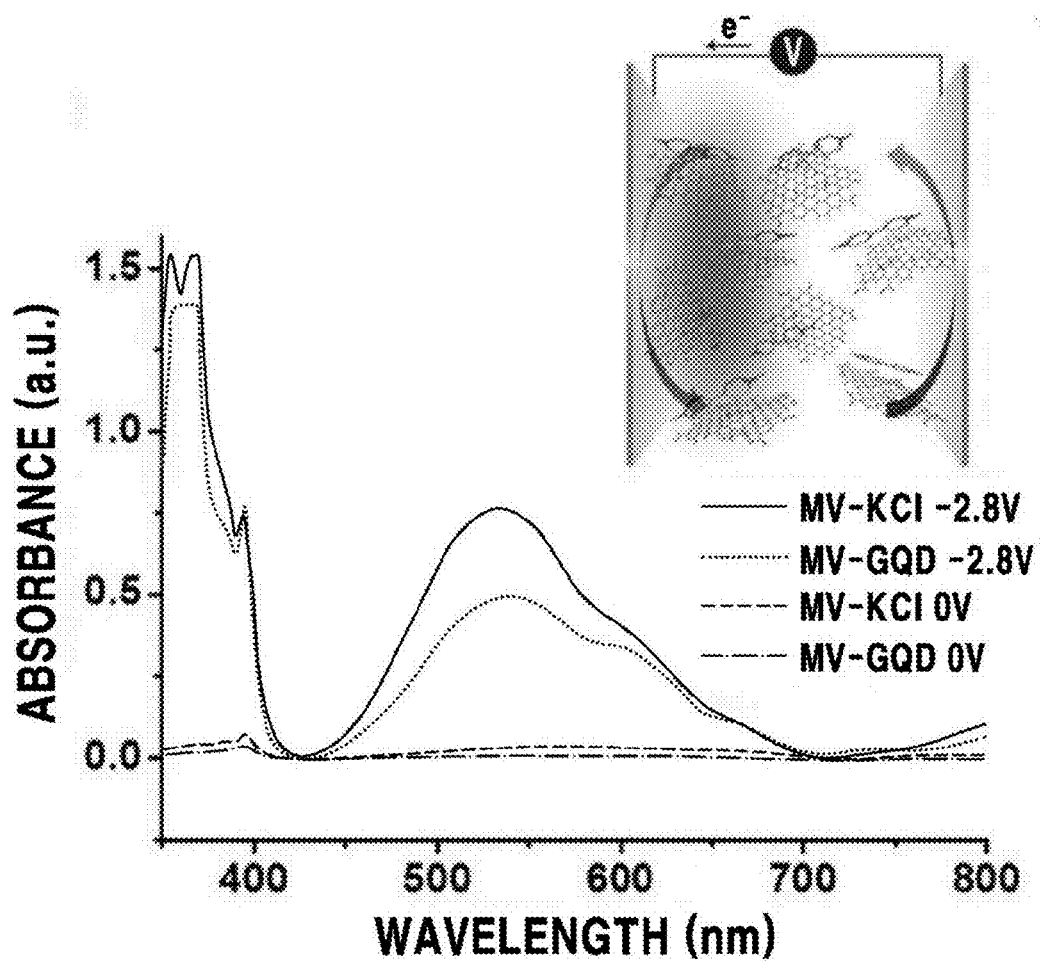
FIG. 2B illustrates changes in the UV-vis absorption spectra from initial states to colored states of 50 mM $MV^{2+}$ with 0.1 M KCl in water and 8 mg $mL^{-1}$ GQD in water, in an Example of the present disclosure. The voltage of –2.8 V was applied to the electrochromic device (ECD). For the ECD, an electrochromic active layer composed of $MV^{2+}$-GQD or $MV^{2+}$-KCl in polyvinyl alcohol (PVA) was sandwiched between ITO electrodes (ITO/$MV^{2+}$-GQD@PVA/ITO or ITO/$MV^{2+}$-KCl@PVA/ITO). The inset is a depiction of a two-electrode cell of the ECD.

For an ECD with a two-electrode electrochemical cell, an electrochromic active layer composed of $MV^{2+}$-GQD or $MV^{2+}$-KCl in polyvinyl alcohol) (PVA) was sandwiched between two ITO electrodes (denoted as ITO/$MV^{2+}$-GQD@PVA/ITO and ITO/$MV^{2+}$-KCl@PVA/ITO, respectively). The reversible color changes (between purple and colorless) of $MV^{2+}$-GQD@PVA and $MV^{2+}$-KCl@PVA in ITO/active layer/ITO ECDs were observed during cyclic voltammetry performed over the voltage range between 0 and −2.8 V. The ECDs were clearly observed to change from colorless to purple as the negative applied voltage was increased beyond −2.0 V. In addition, as this voltage was applied, an optical contrast between the colored state and the bleached state in the device was clearly achieved. This Example chose −2.8 V as the voltage corresponding to the colored state of the $MV^{2+}$ ECDs based on experiments of absorption spectra of voltages. To examine the switching behavior, UV-vis absorption spectra were measured under applied voltages of 0 and −2.8 V in the initial state of the $MV^{2+}$ ECDs (FIG. 2B). Applying the voltage of −2.8 V increased the maximum absorption of both ECDs at 550 nm, indicating the transformation from a monocationic radical form ($MV^{+\bullet}$) to a dicationic form ($MV^{2+}$) by the capture of one electron. $MV^{2+}$ was colorless, whereas $MV^{+\bullet}$ was intensely purple as a strongly absorptive optical charge was transferred between +1-valent and zero-valent nitrogens of $MV^{+\bullet}$. Specifically, the blue radical cations ($MV^{+\bullet}$) were reversibly dimerized in an aqueous solution to form a red cation dimer $[(MV^{+\bullet})_2]$, and together these two species had an intense purple color. The UV-vis spectra of $MV^{2+}$-GQD ECDs are identical to those of $MV^{2+}$-KCl ECDs (FIG. 2B), implying that GQD acts as an electron shuttle in the electrolyte-free $MV^{2+}$-GQD ECD. Moreover, after approximately 3000 s of the repeated electrochromic cycling, the absorption ratio of the colored state to the bleached state for the $MV^{2+}$-KCl ECD drastically decreased whereas that of the $MV^{2+}$-GQD ECD was nearly constant (FIGS. 4A~4D and FIG. 9).

Figure 3A:
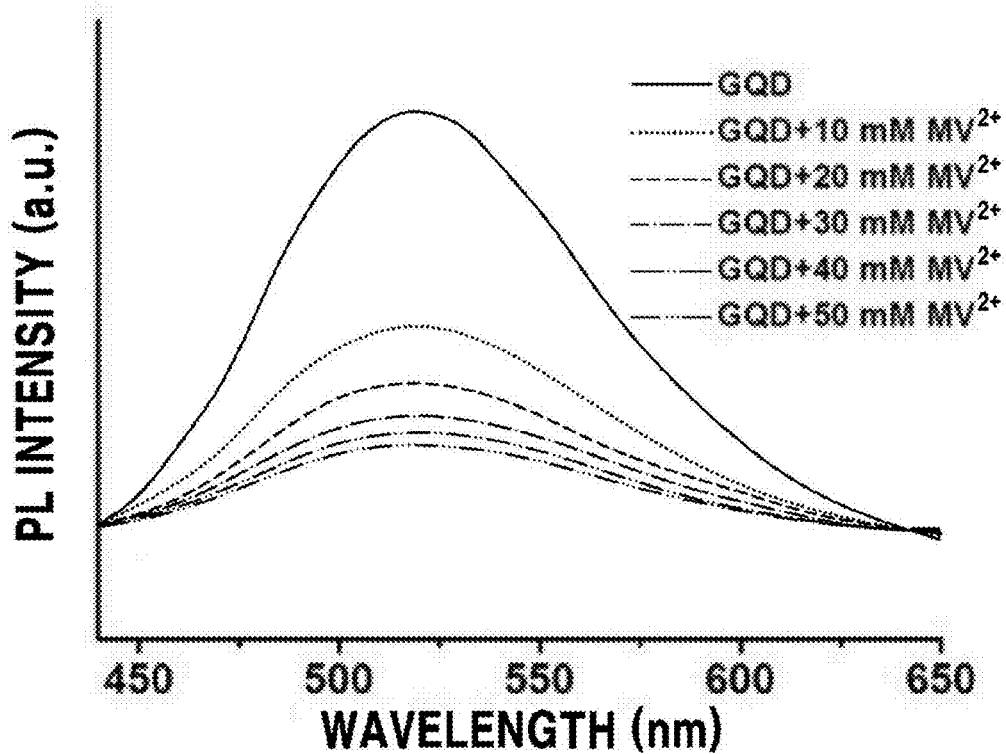
FIG. 3A illustrates photoluminescence of a GQD solution with $MV^{2+}$ excited at 420-650 nm, in an Example of the present disclosure.
Figure 3B:
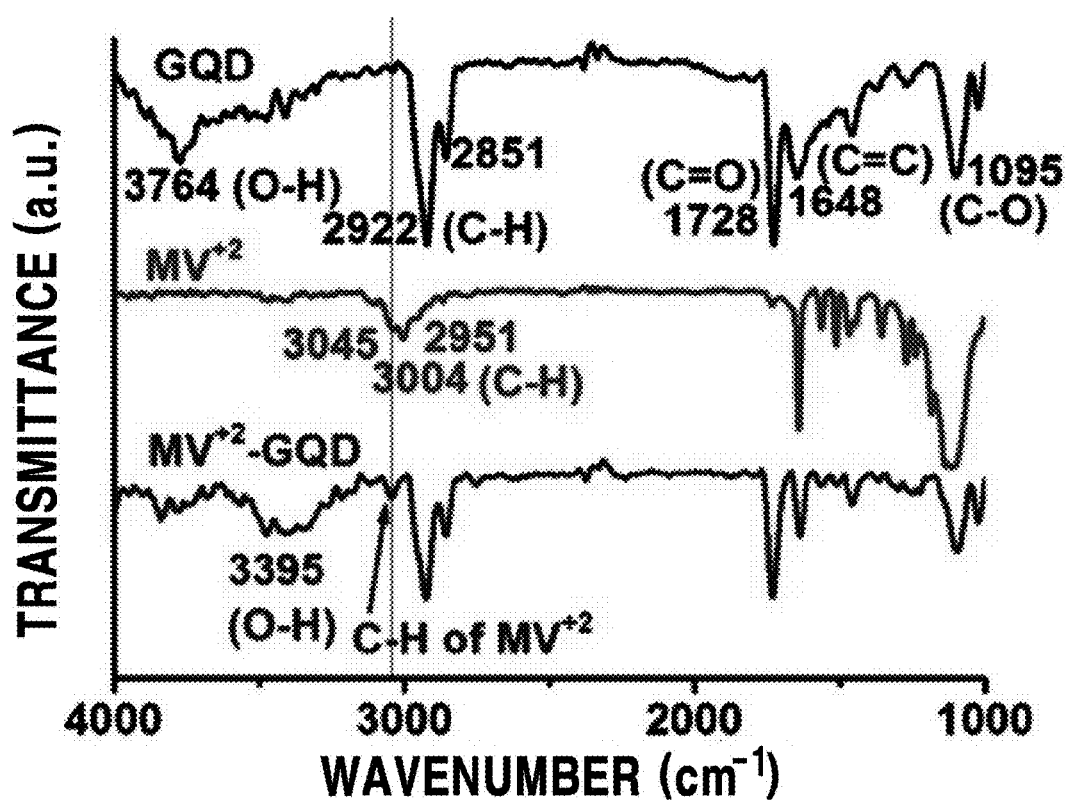
FIG. 3B shows Fourier transform infrared (FTIR) spectra of GQD, $MV^{2+}$, and $MV^{2+}$-GQD films, in an Example of the present disclosure.
Figure 3C:
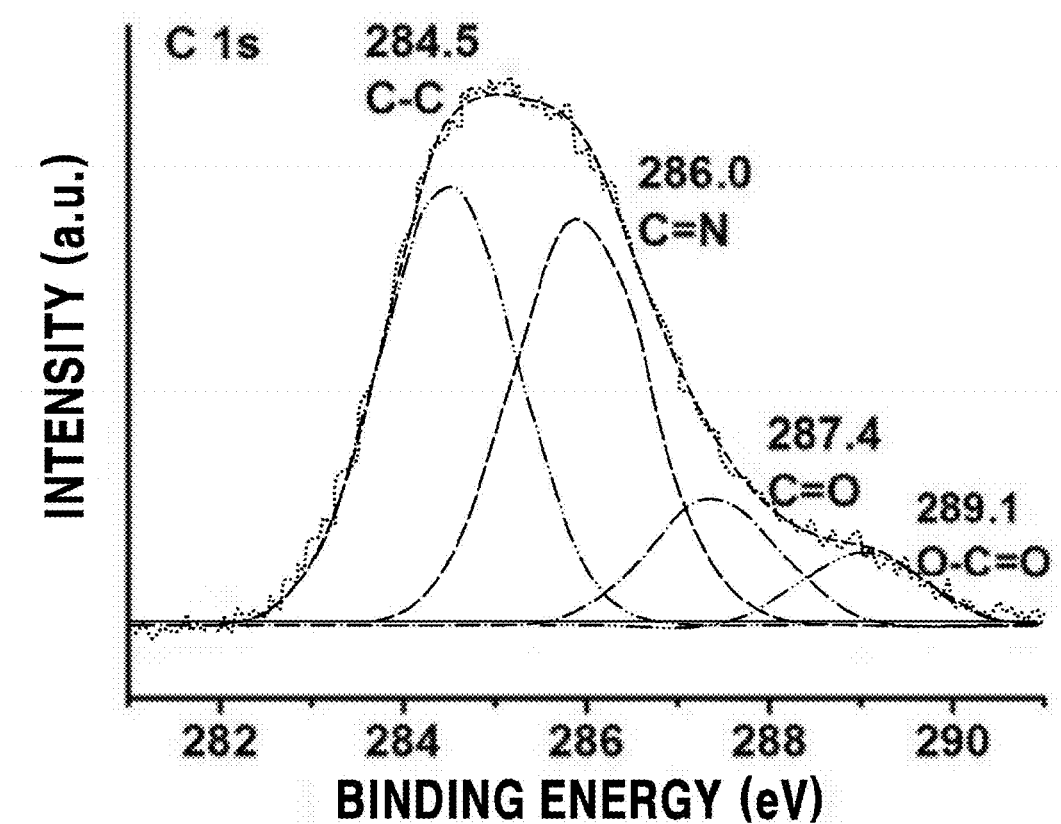
FIG. 3C shows X-ray photoelectron spectra of C1s for a $MV^{2+}$-adsorbed GQD film, in an Example of the present disclosure.
Figure 3D:
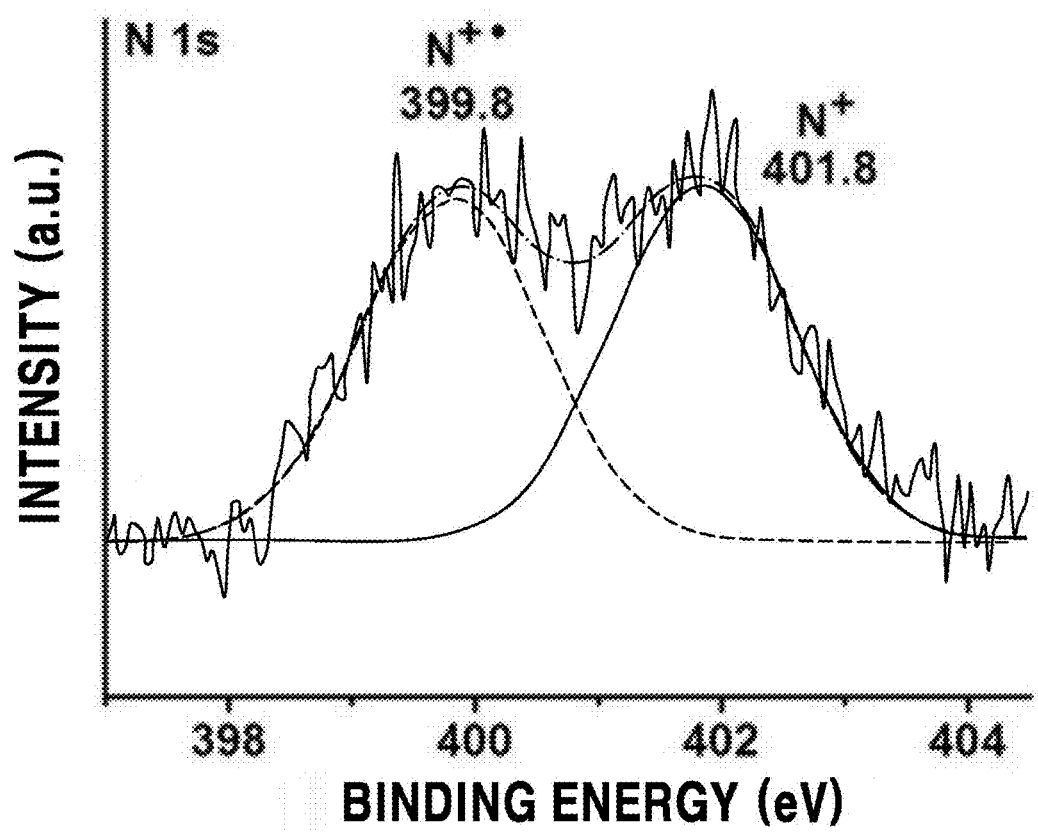
FIG. 3D shows X-ray photoelectron spectra of N1s for a $MV^{2+}$-adsorbed GQD film, in an Example of the present disclosure.
Figure 10:
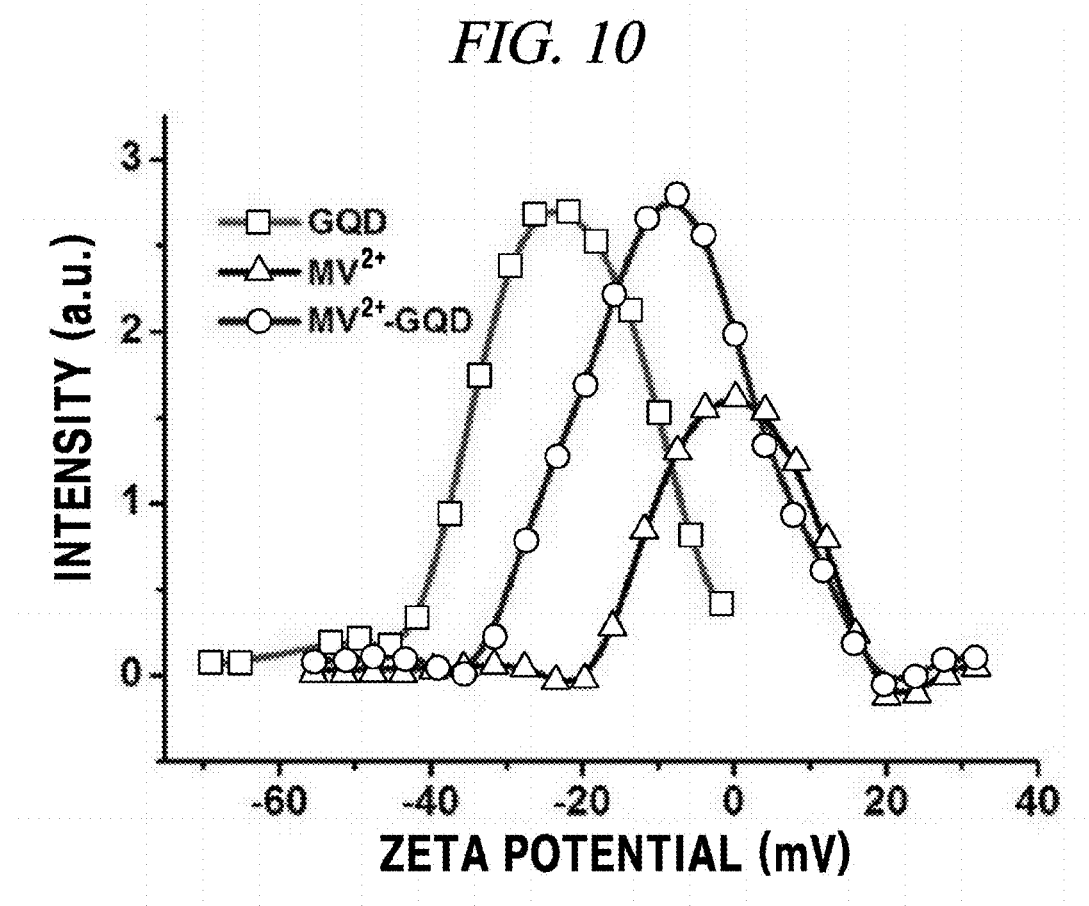
FIG. 10 shows zeta potential graphs for GQD, $MV^{2+}$, and $MV^{2+}$-GQD solutions, in an Example of the present disclosure.

Non-covalent interactions in an electrolyte-free electrochromic nanocomposite, $MV^{2+}$-GQDs, were analyzed using the zeta potential measurement (FIG. 10). The measured zeta potentials of $MV^{2+}$ and GQDs were approximately 0.05 mV and −22.6±6.0 mV, respectively. The negatively charged GQDs were partially neutralized by the positively charged $MV^{2+}$ and changed to −9.0±1.8 mV in $MV^{2+}$-GQDs, indicating the intermolecular non-covalent bond of $MV^{2+}$ onto the surface of the GQDs. This bond was also proved by the photoluminescence spectra of $MV^{2+}$-GQDs (FIG. 3A). The fluorescence intensity of GQDs in the presence of $MV^{2+}$ decreased as the concentration of $MV^{2+}$ increased. The photoluminescent electron density of GQDs decreased as the electron deficient $MV^{+\bullet}$ withdrew electrons of GQDs in the excited state (GQD*), resulting from the fluorescence quenching effect. These results proved that GQDs can enable stable and durable electrochromic performance in $MV^{2+}$-GQD ECDs by means of the strong electrostatic method, and the π-π stacking interactions between $MV^{2+}$ and GQDs as well as the interactions of cation-π electrons between $MV^{2+}$ (and/or $MV^{+}$) as π-electron acceptors and the GQDs as π-electron donors. Furthermore, the Fourier transforms infrared (FTIR) spectroscopy in FIG. 3B proved stable attachments of $MV^{2+}$ onto the surface of GQD. The $MV^{2+}$-GQD exhibited GQD's typical peaks of C—H asymmetric and symmetric vibration (2,922 $cm^{-1}$ and 2,851 $cm^{-1}$), and a new peak (3,045 $cm^{-1}$) was attributed to the stretching vibration of the C—H bond from adsorption of $MV^{2+}$. In X-ray photoelectron spectra of $MV^{2+}$-GQD (FIG. 3C and FIG. 3D), the C1s spectrum of the $MV^{2+}$-adsorbed GQD film showed a new shoulder peak due to the adsorption of $MV^{2+}$(C=N at 286.0 eV) in comparison with the spectrum of a GQD film. Also, the N1s spectrum of the $MV^{2+}$-adsorbed GQD film can be fitted with two peaks assigned to the positively charged nitrogen (401.8 eV) and the viologen radical cation due to X-ray excitation (399.8 eV).

Figure 4C:
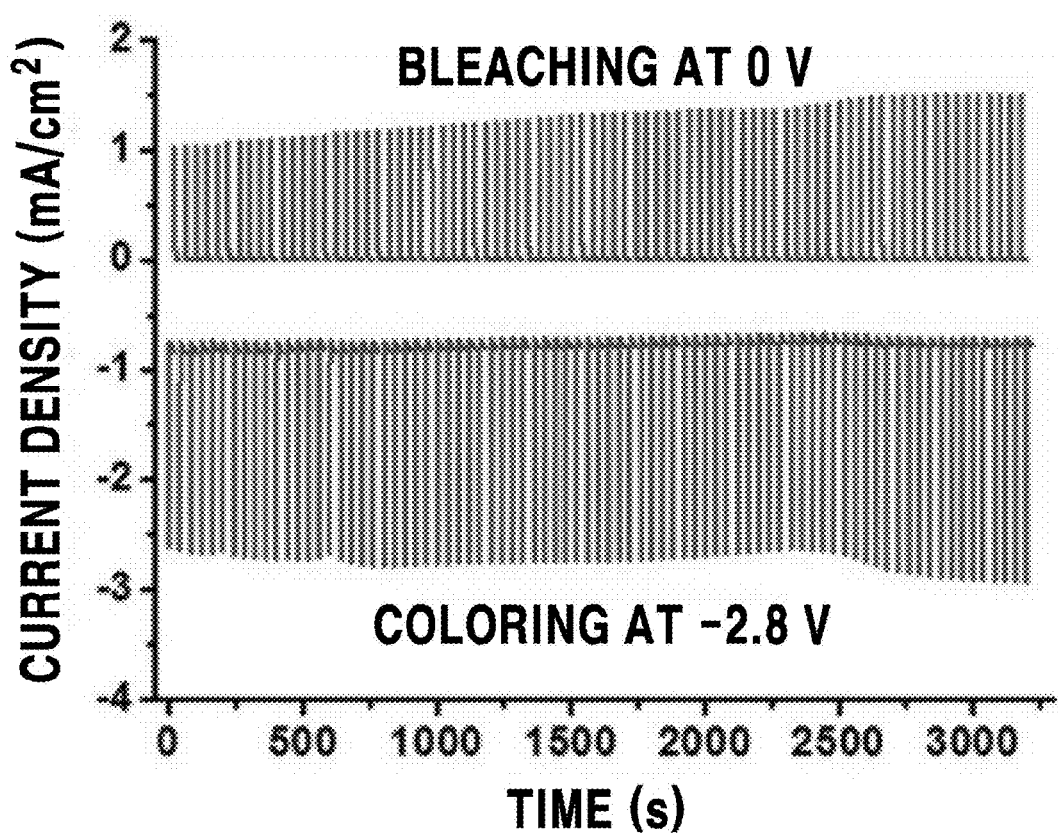
FIG. 4C shows chronoamperometric response by voltage switching between 0 V (bleached state) and –2.8 V (colored state) for 50 mM $MV^{2+}$ in an ECD at 550 nm, and the ECD of ITO-on-glass electrodes were prepared with 8 mg $mL^{-1}$ GQD in PVA [MV-GQD@PVA], in an Example of the present disclosure.
Figure 4D:
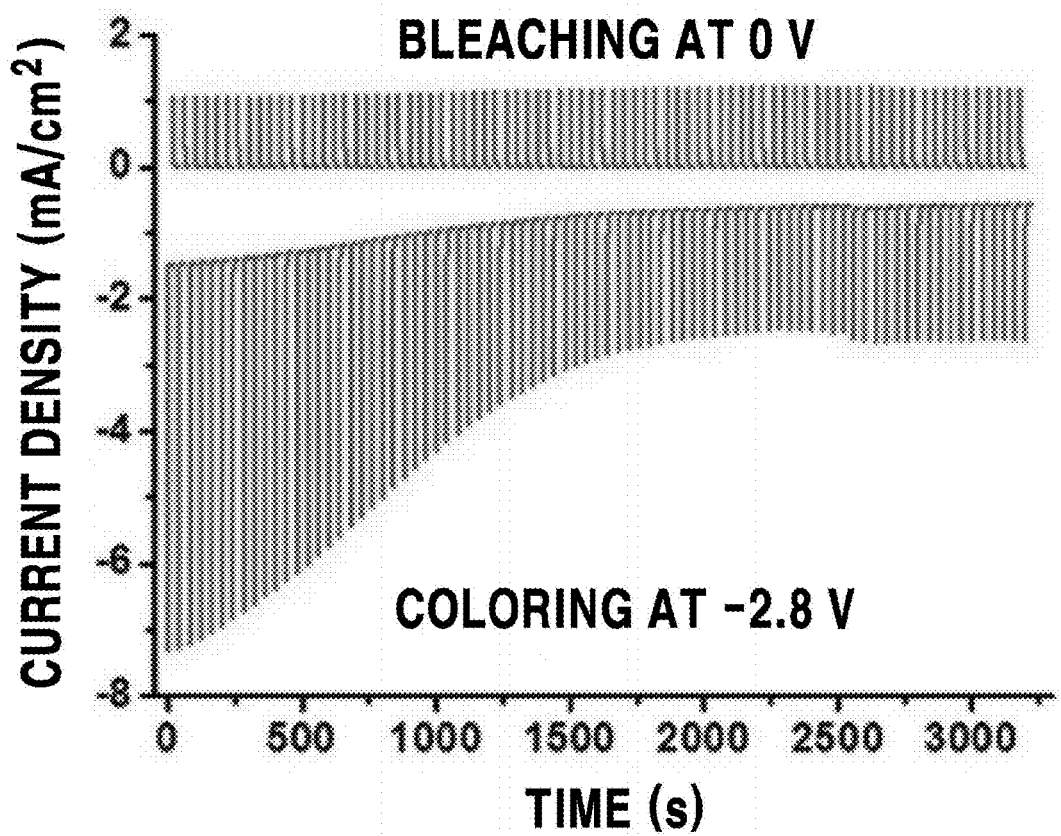
FIG. 4D shows corresponding chronoamperometric response by voltage switching between 0 V (bleached state) and –2.8 V (colored state) for 50 mM $MV^{2+}$ in an ECD at 550 nm, and the ECD of ITO-on-glass electrodes were prepared with 0.1 M KCl in PVA [MV-KCl@PVA], in an Example of the present disclosure.
Figure 11A:
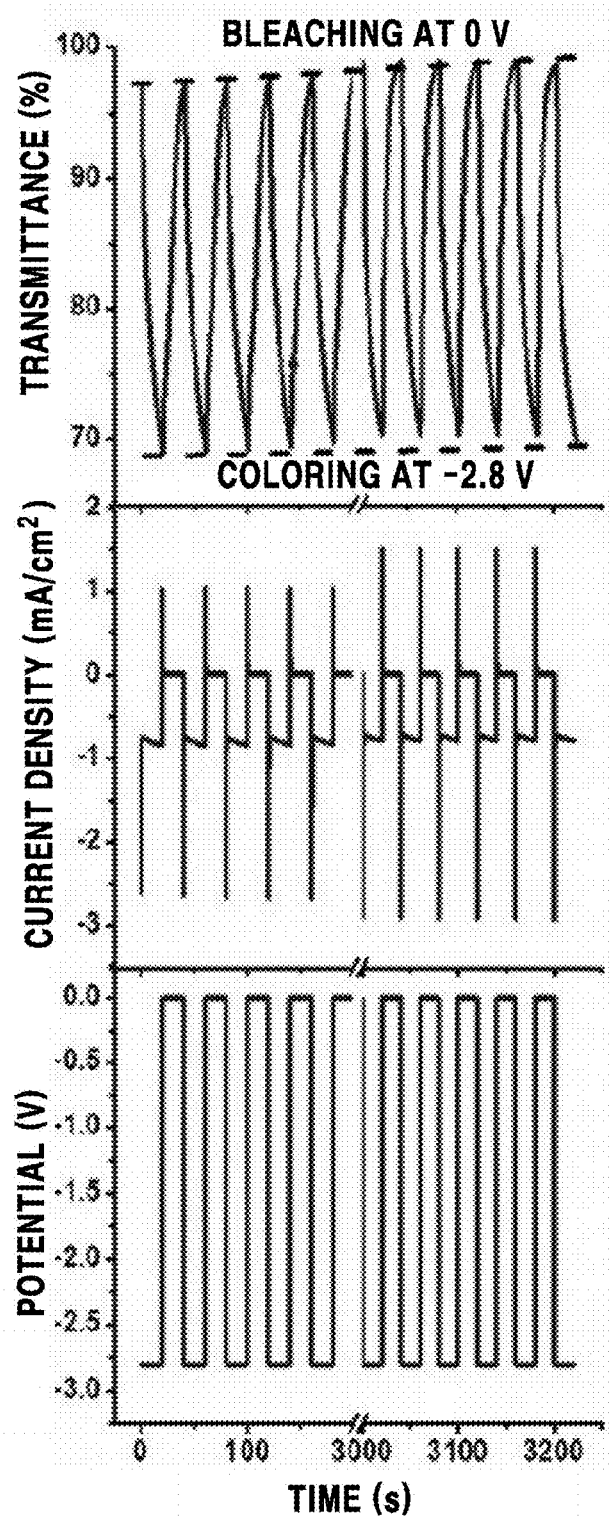
FIG. 11A shows voltage-controlled transmittance changes at 550 nm and corresponding chronoamperometric responses by voltage switching between 0 (bleached state) and −2.8 V (colored state) for $MV^{2+}$-GQD@PVA in an ECD, in an Example of the present disclosure.
Figure 11B:
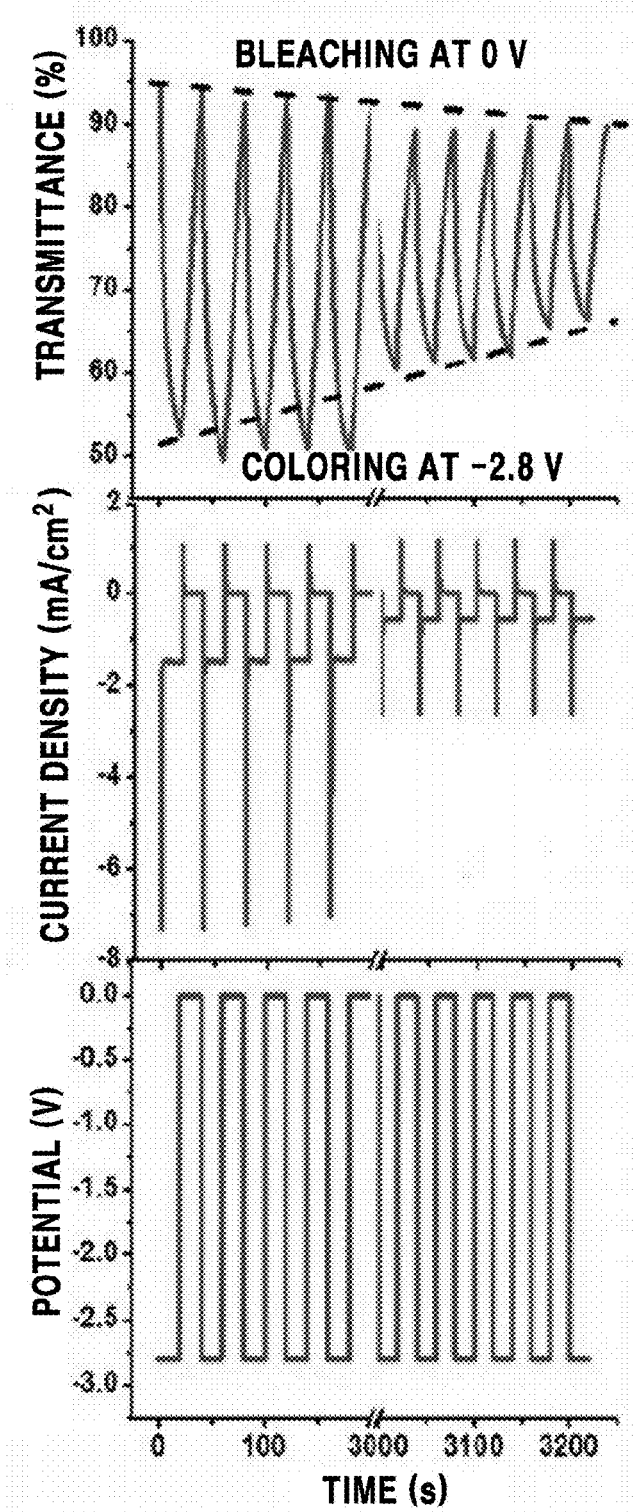
FIG. 11B shows voltage-controlled transmittance changes at 550 nm and corresponding chronoamperometric responses by voltage switching between 0 (bleached state) and −2.8 V (colored state) for $MV^{2+}$-KCl@PVA in an ECD, in an Example of the present disclosure.

The electrochromic performance of electrolyte-free $MV^{2+}$-GQD ECDs was examined using a spectro-electrochemical technique, monitoring the changes in a device's transmittance at 550 nm in response to changes in the applied voltage (FIGS. 4A~4D). The concentration of GQD strongly influenced the intensity of the absorption, and the color change was clearly observed at a high concentration of GQD (8 mg/mL of a concentration of GQD in $MV^{2+}$ in water). The color of the ECDs could be repeatedly and reversibly changed between colorless and purple by applying pulsed voltages of 0 (bleached state) and −2.8 V (colored state) with a pulse width of 20 s. $MV^{2+}$-GQD ECDs showed a more stable switching behavior than $MV^{2+}$-KCl ECDs and good durability over the test period, which was more than 3,200 s (FIG. 11A and FIG. 11B, higher magnification repeated cycles of ECD performances responding to applied voltage pulses). In principle, the high-voltage charge injection used to achieve the colored state could lead to rapid degradation of the active layer. To avoid the degradation of the active layer, and maintain a constant level of ECD performance under the applied voltages, it is necessary for the active layer to include an electron-conducting medium. GQD is a well-known conductive nanomaterial that can stably absorb electrons in $MV^{2+}$-GQD ECDs. As a result, the transmittance of the $MV^{2+}$-GQD ECDs at 550 nm reliably changed by 29% over repeated cycles (FIG. 4A), whereas that of the $MV^{2+}$-KCl ECDs dramatically decreased from 45% to 24% over repeated cycles (FIG. 4B). The high stability of the transmittance change that $MV^{2+}$-GQD ECDs underwent was presumably due to the influence of the strong electrostatic interactions between the $MV^{2+}$ and the GQDs in contrast to the electrolytic $MV^{2+}$-KCl ECDs that did not have such interactions.

Figure 12A:
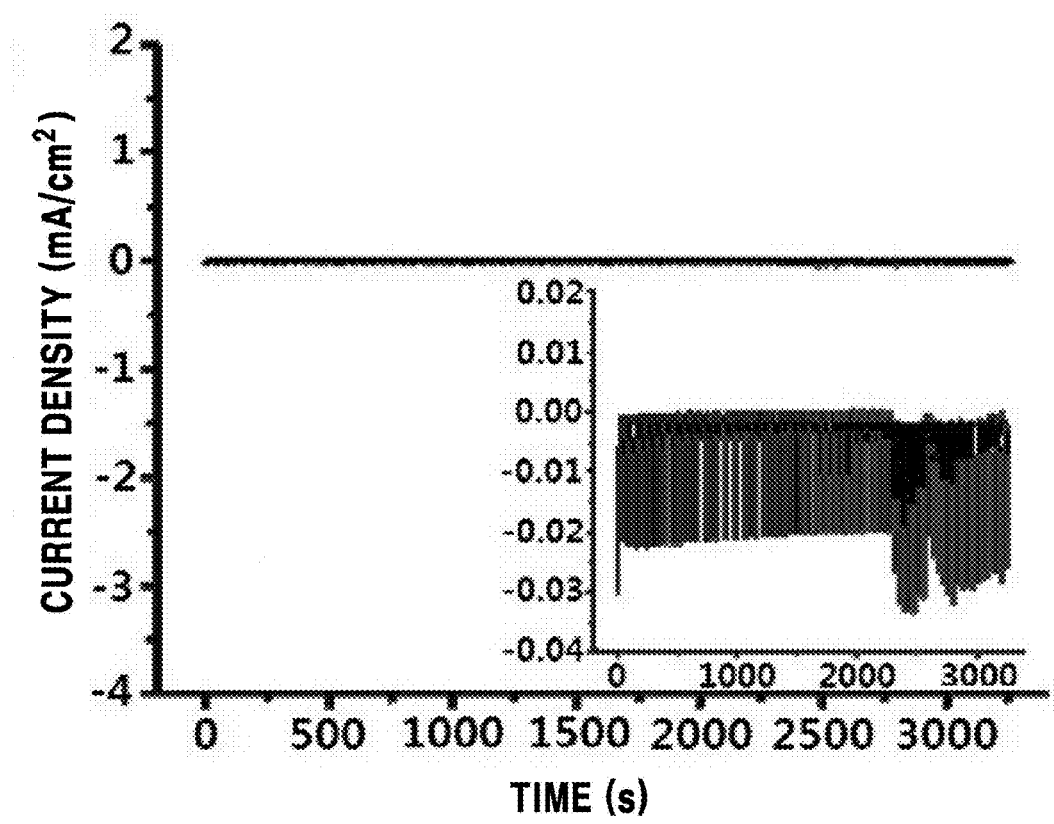
FIG. 12A shows control experiments for the electrochemical responses of a PVA/water sample without $MV^{2+}$-GQD under voltage switching cycles between 0 V and −2.8 V, in an Example of the present disclosure, and the inset shows the zoomed-in plots.
Figure 12B:
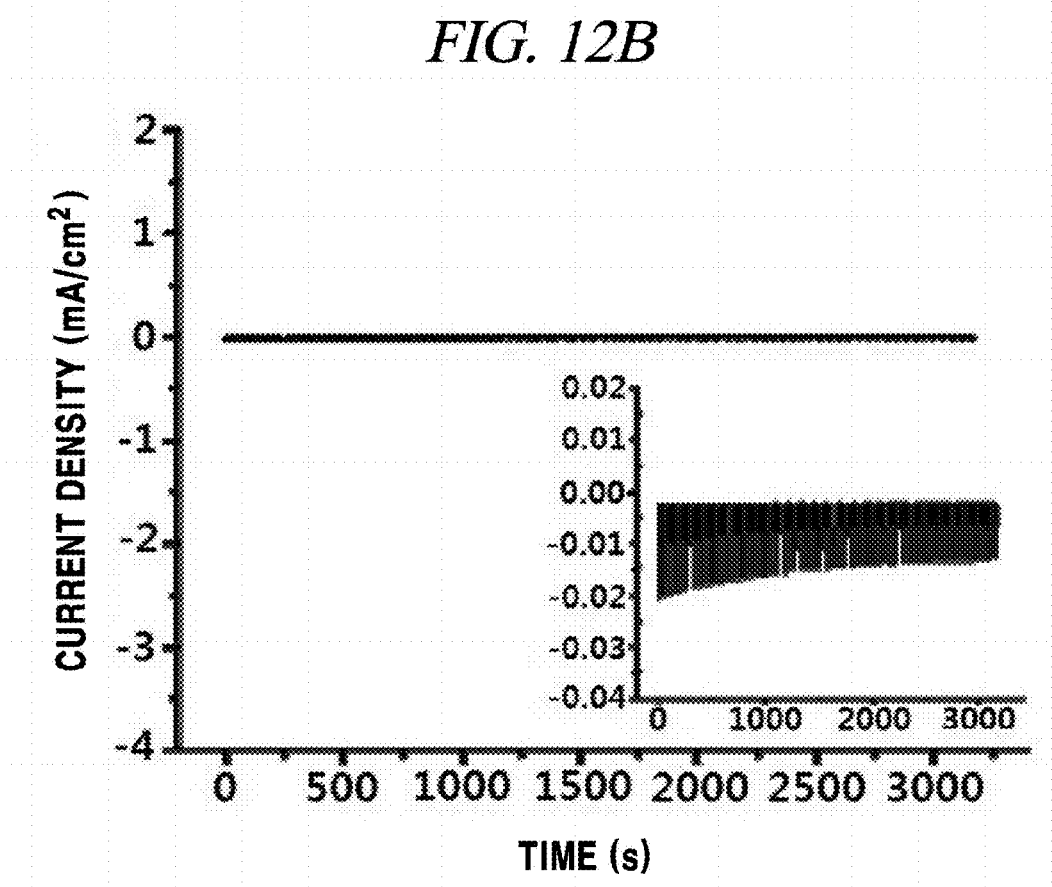
FIG. 12B shows control experiments for the electrochemical responses of a GQD-PVA/water sample without $MV^{2+}$ under voltage switching cycles between 0 V and −2.8 V, in an Example of the present disclosure, and the inset shows the zoomed-in plots.

In chronoamperometric responses of each ECD device (FIG. 4C and FIG. 4D), the $MV^{2+}$-GQD ECD maintained its maximum current while that of the $MV^{2+}$-KCl ECD drastically decreased, indicating that the $MV^{2+}$-KCl active layer was quickly degraded during the continuous voltage cycling, but that the $MV^{2+}$-GQD active layer remained stable throughout the long test. In addition, as control experiments (FIG. 12A and FIG. 12B), the electrochemical responses of a PVA/water sample without $MV^{2+}$-GQD and a GQD-PVA/water sample without $MV^{2+}$ showed very stable non-Faradaic (electrochemical) current flows in a potential switch between 0 and −2.8 V for repeated voltage-switching cycles. This indicates that water cannot affect electrochemical stability of $MV^{2+}$-GQD@PVA ECDs and that electrolyte-free $MV^{2+}$-GQD@PVA ECDs can maintain electrochromic stability during electrochemical measurements for a long-term application.

Figure 13:
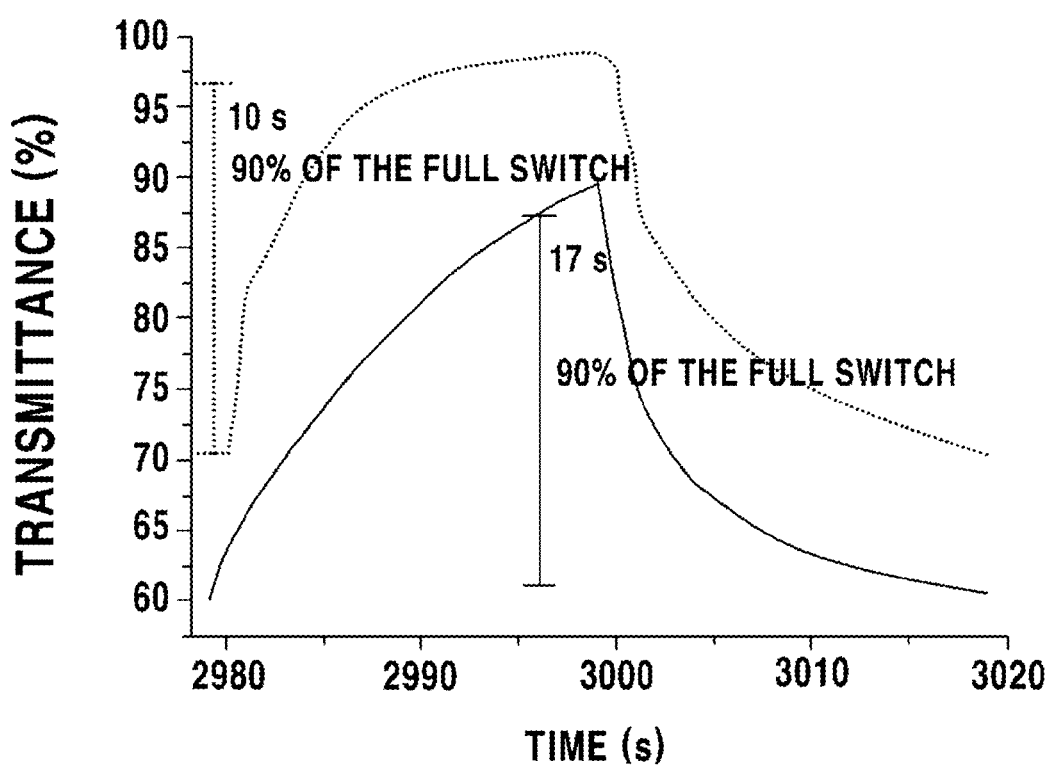
FIG. 13 shows electrochromic switching characteristics between −2.8 V and 0 V for $MV^{2+}$-GQD and $MV^{2+}$-KCl at 550 nm with voltage pulses of −2.8 V and 0 V in a range of 20 s, in an Example of the present disclosure.
Figure 14:
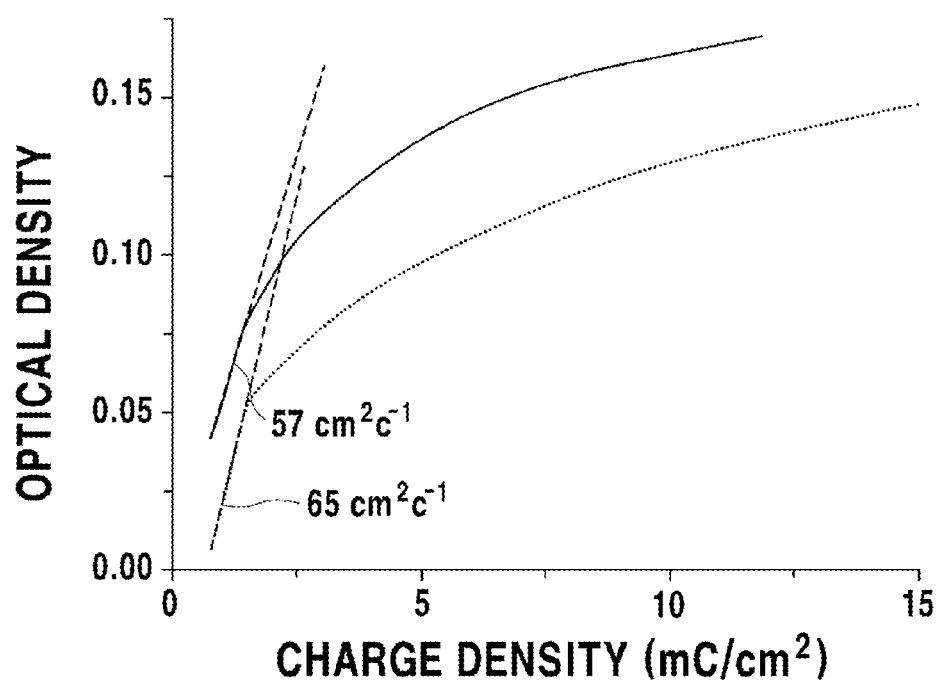
FIG. 14 shows the plot of optical density (OD) versus charge density with MV-GQD$^{2+}$ (dotted line) and $MV^{2+}$-KCl (solid line), and the OD was measured at 550 nm at −2.8 V, in an Example of the present disclosure.

From the voltage-controlled transmittance changes, switching time (bleaching time) for 90% of the color transition between purple and colorless was measured for each ECD. The bleaching time (approximately 10 s) of $MV^{2+}$-GQD was much shorter than that (approximately 17 s) of $MV^{2+}$-KCl (FIG. 13). Furthermore, the coloration efficiency (CE) was calculated to evaluate the electrochromic performance of the ECDs. CE[CE $(\eta)=\Delta OD/Q$, where OD is the optical density, and Q is the charge density] was determined by the absorbance change $[\Delta OD\ (\lambda)=\log T_b/T_c$, where $T_b$ and $T_c$ are the transmission values in the bleached and colored states, respectively, at a certain wavelength] from the unit charge density required for the colored state or the bleached state (FIG. 14). The CE values of $MV^{2+}$-GQD and $MV^{2+}$-KCl have been measured to be 65 $cm^2\ C^{-1}$ and 57 $cm^2\ C^{-1}$, respectively. Consequently, the retention times for the colored and colorless states, the coloration time, and the coloration efficiency of $MV^{2+}$-GQD ECDs were all superior to those of $MV^{2+}$-KCl ECDs.

Figure 5A:
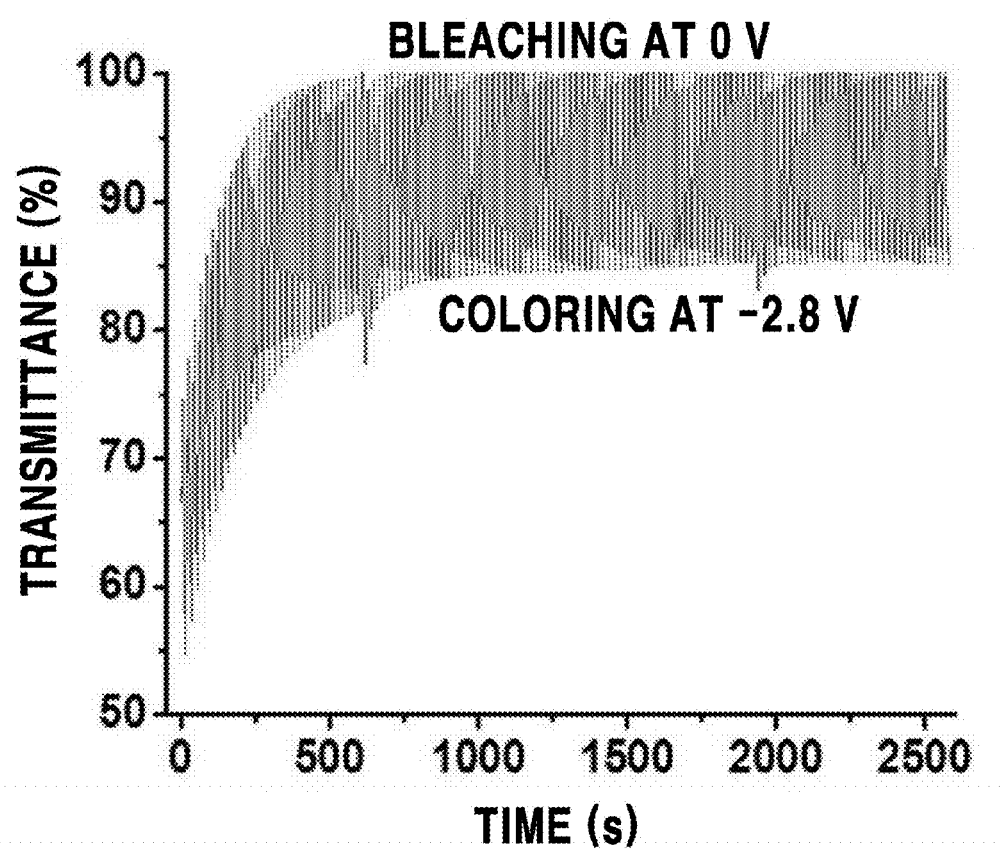
FIG. 5A shows a heat effect on $MV^{2+}$-GQD ECDs: voltage-controlled transmittance changes at 550 nm after the heat treatment at 80° C. for 10 min, and the $MV^{2+}$-GQD ECD was prepared by using 50 mM $MV^{2+}$ and 8 mg $mL^{-1}$ GQD in PVA, in an Example of the present disclosure.
Figure 5B:
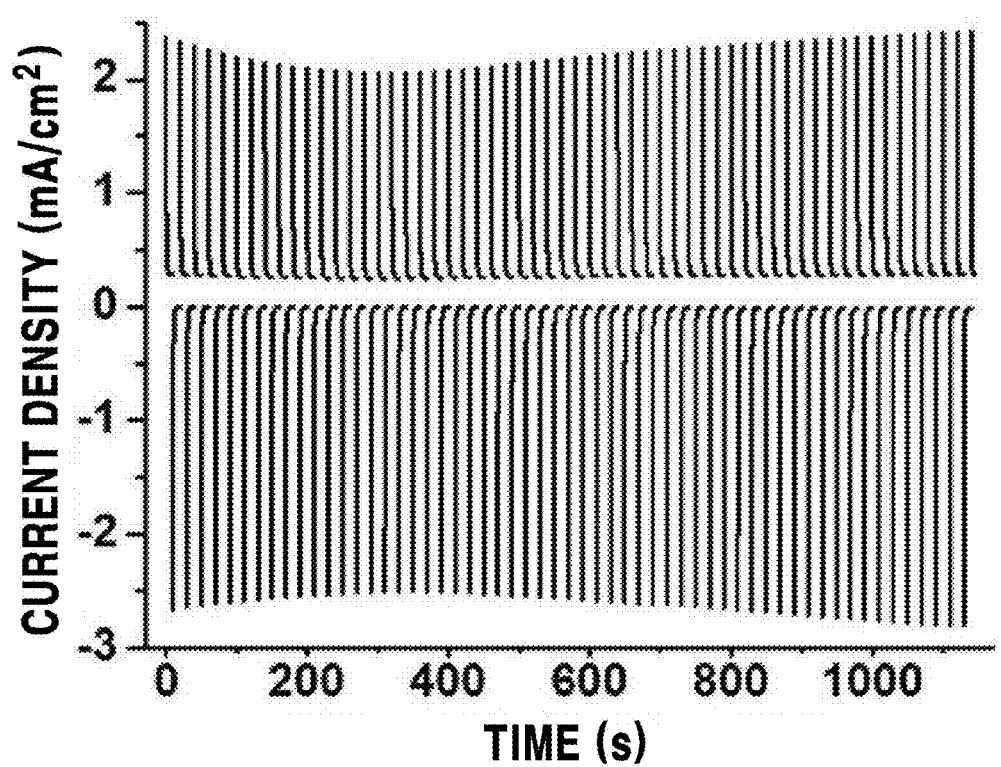
FIG. 5B shows a heat effect on $MV^{2+}$-GQD ECD: chronoamperometric responses with voltage switching between 0 V (bleached state) and –2.8 V (colored state), and the $MV^{2+}$-GQD ECD was prepared by using 50 mM $MV^{2+}$ and 8 mg $mL^{-1}$ GQD in PVA, in an Example of the present disclosure.
Figure 15A:
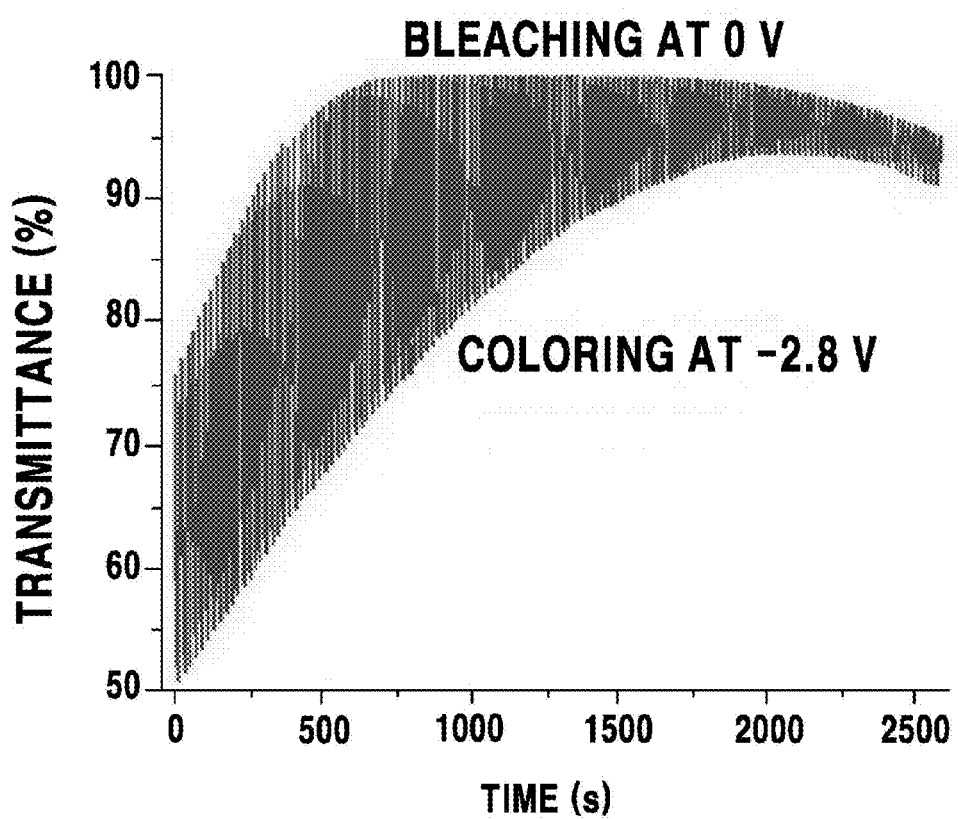
FIG. 15A shows a heat effect of $MV^{2+}$-KCl ECD; voltage-controlled transmittance changes at 550 nm after the heat treatment at 80° C. for 10 min, in an Example of the present disclosure.
Figure 15B:
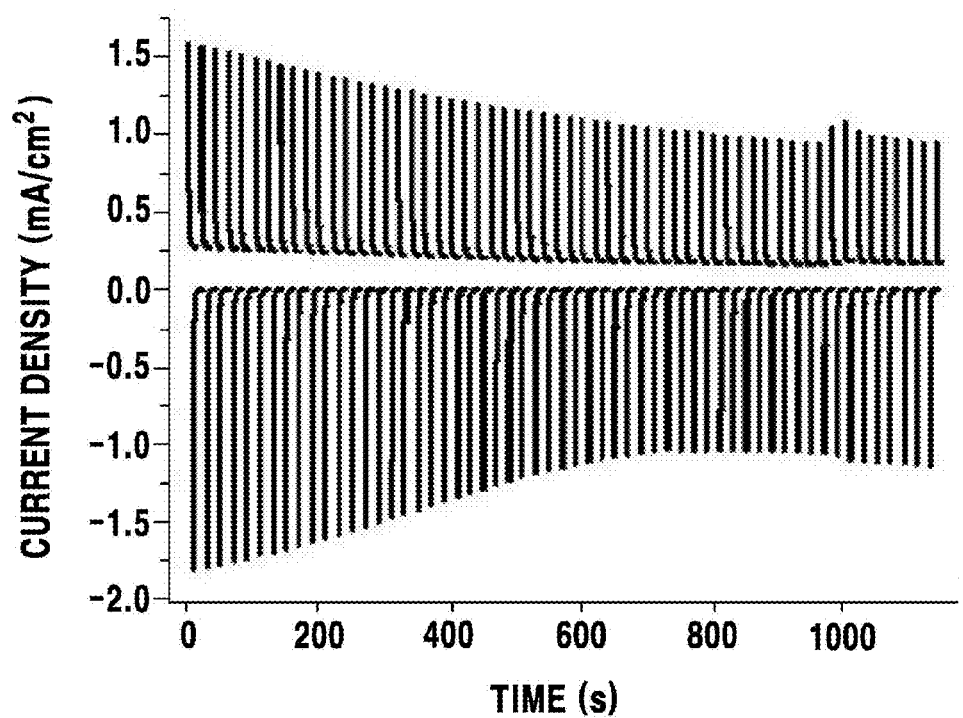
FIG. 15B shows a heat effect of $MV^{2+}$-KCl ECD; chronoamperometric responses with voltage switching between 0 V (bleached state) and −2.8 V (colored state), in an Example of the present disclosure.

In order to apply ECDs in a practical system, it may be necessary to assess the stability of their performance in harsh environments, such as high temperatures. Thus, in addition to investigating the electrochromic performance of each ECD at a room temperature, the $MV^{2+}$-GQD ECDs were also tested after exposing them to an 80° C. oven for a few minutes. The $MV^{2+}$-GQD showed very stable performance in voltage-controlled transmittance changes in this test (FIG. 5). The transmittance change of approximately 20% in the $MV^{2+}$-GQD ECD was preserved for 2500 s or longer of cycling between the colored and bleached states (FIG. 5A), while that of the $MV^{2+}$-KCl ECD drastically diminished (FIG. 15A). FIG. 5B and FIG. 15B show the current density changes corresponding to the voltage-controlled transmittance changes for the $MV^{2+}$-GQD ECD and the $MV^{2+}$-KCl ECD, respectively. The change in current density of the $MV^{2+}$-GQD after exposure to heat was highly stable, indicating that the same coloration efficiency of the $MV^{2+}$-GQD ECDs was maintained without degradation over long-term operation. The stability of the electrochromic performance of the $MV^{2+}$-GQD ECDs, despite their exposure to heat, indicated that the electrical conductivity of the $MV^{2+}$-GQD ECD was maintained well due to the good conductivity of GQD and the strong composition of the $MV^{2+}$-GQD structure. However, in the $MV^{2+}$-KCl ECD, the solvated electrolytic $K^+$ and $Cl^-$ ions have poor thermal endurance, possibly forming aggregates lacking water molecules, whereas the thermal endurance of GQD sheets is good, possibly due to the insertion of water molecules between the sheets, as observed in a graphene oxide film, or due to lack of aggregation of the GQD at a high temperature caused by the strong electrostatic interactions, the $\pi$-$\pi$ stacking interactions, and the $\pi$-electron donor-acceptor interactions between the GQDs and $MV^{2+}$. Therefore, $MV^{2+}$-GQD ECDs are much more thermally stable than $MV^{2+}$-KCl ECDs, which turns out to be one of the valuable advantages of GQD-supported $MV^{2+}$ ECDs.

Figure 6:
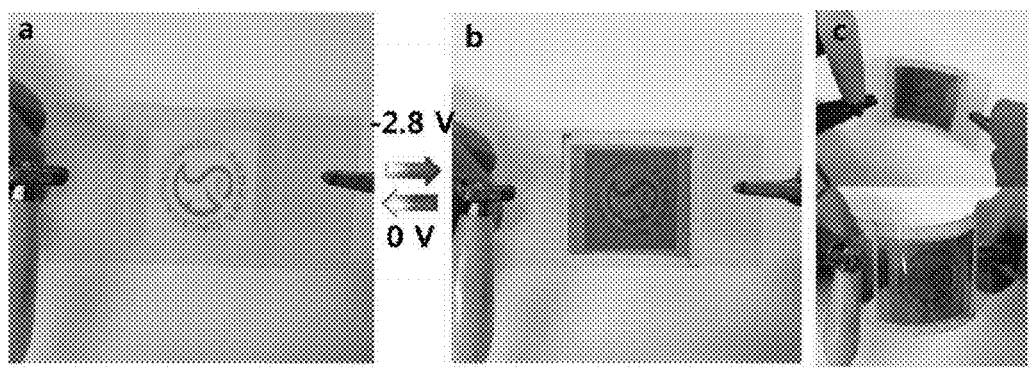
FIG. 6 shows photographs for a reversible performance of a flexible $MV^{2+}$-GQD ECD (containing 8 mg $mL^{-1}$ GQD and 100 mM $MV^{2+}$ in PVA) with ITO-on-PET (polyethylene terephthalate) in the bleached state and the colored state, in an Example of the present disclosure.
Figure 7A:
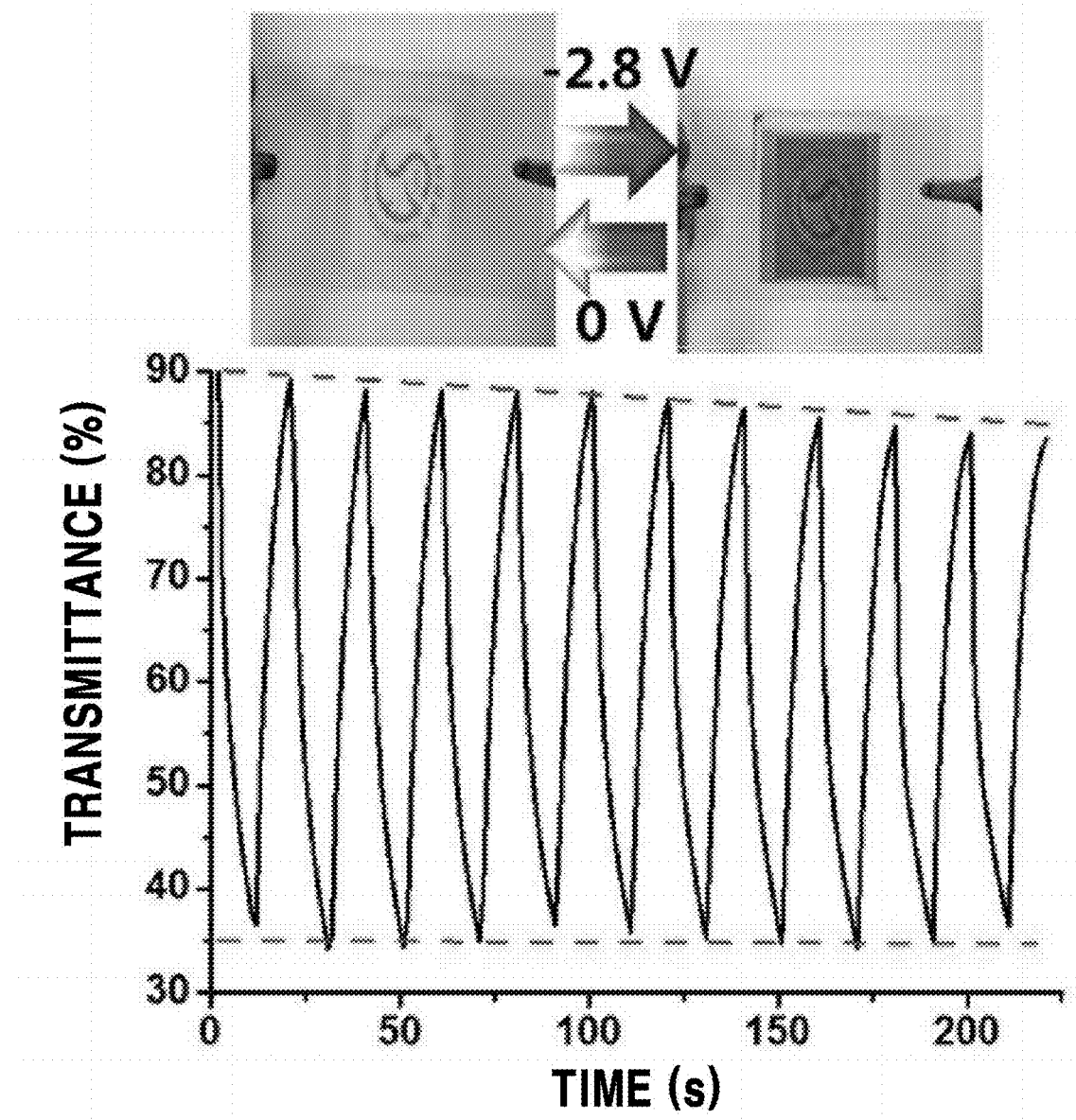
FIG. 7A shows voltage-controlled transmittance changes (at 550 nm) and photographs for preservation tests of the electrochromic performance of flexible $MV^{2+}$-GQD ECDs containing 8 mg $mL^{-1}$ GQD and 100 mM $MV^{2+}$ in PVA: for a flat device, in an Example of the present disclosure.
Figure 7B:
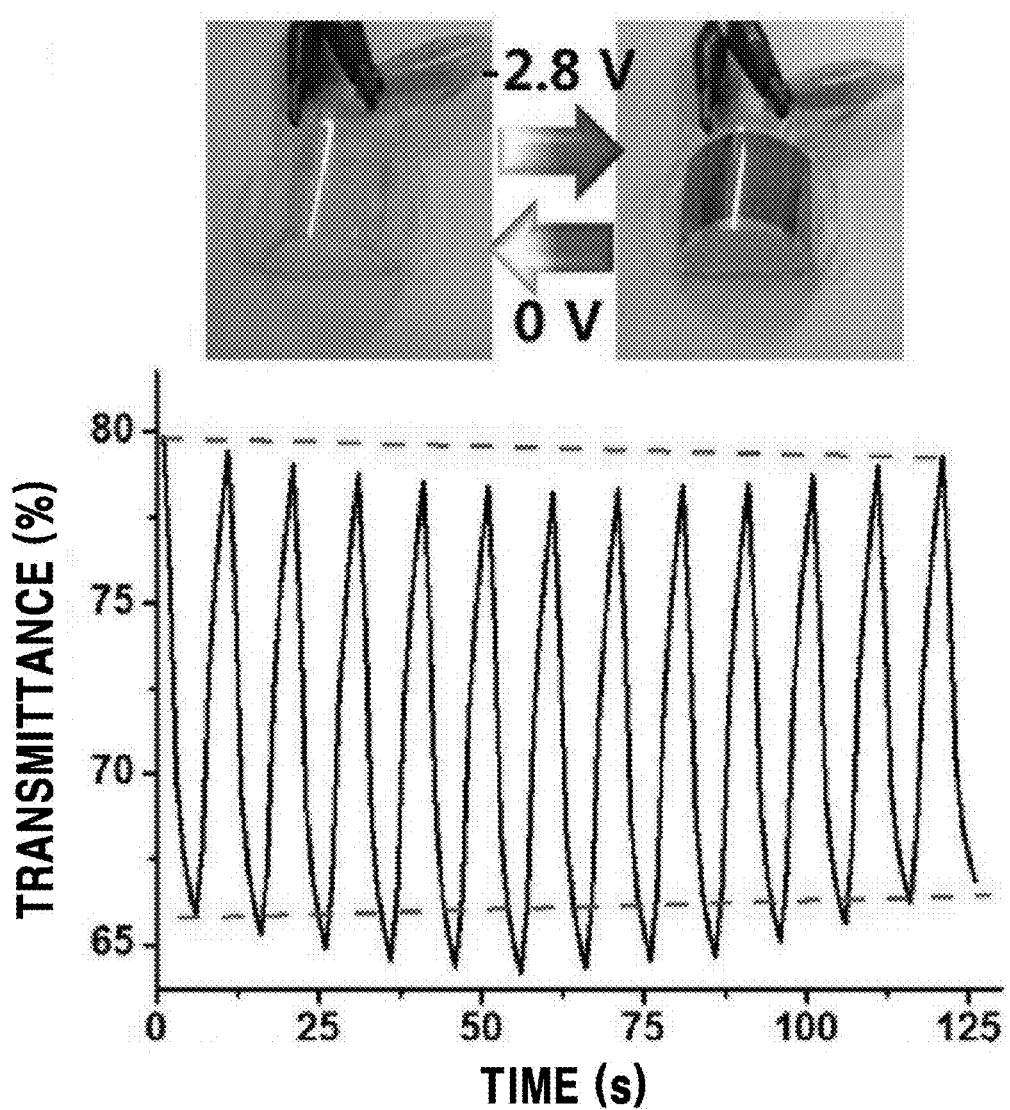
FIG. 7B shows voltage-controlled transmittance changes (at 550 nm) and photographs for preservation tests of the electrochromic performance of flexible $MV^{2+}$-GQD ECDs containing 8 mg $mL^{-1}$ GQD and 100 mM $MV^{2+}$ in PVA: for a bent device, in an Example of the present disclosure.
Figure 8A:
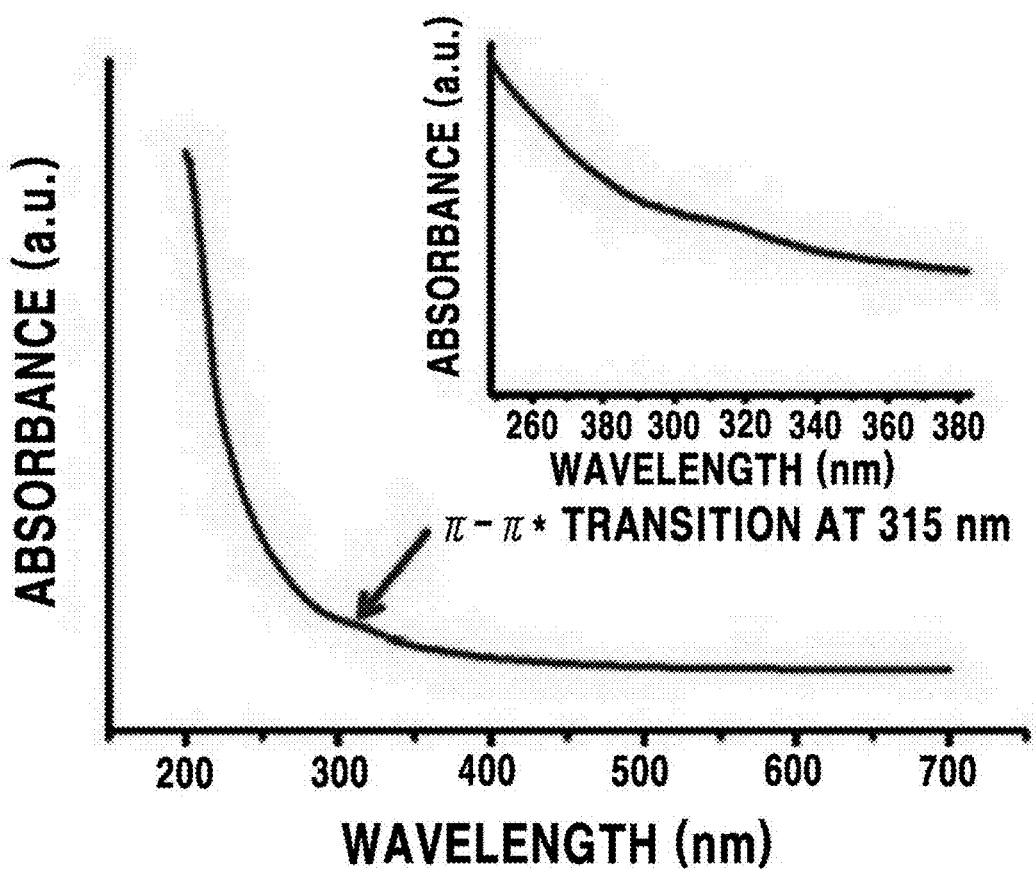
FIG. 8A is a UV-visible absorption spectrum of GQDs dispersed in water, and the inset is a magnified spectrum thereof, in an Example of the present disclosure.
Figure 8B:
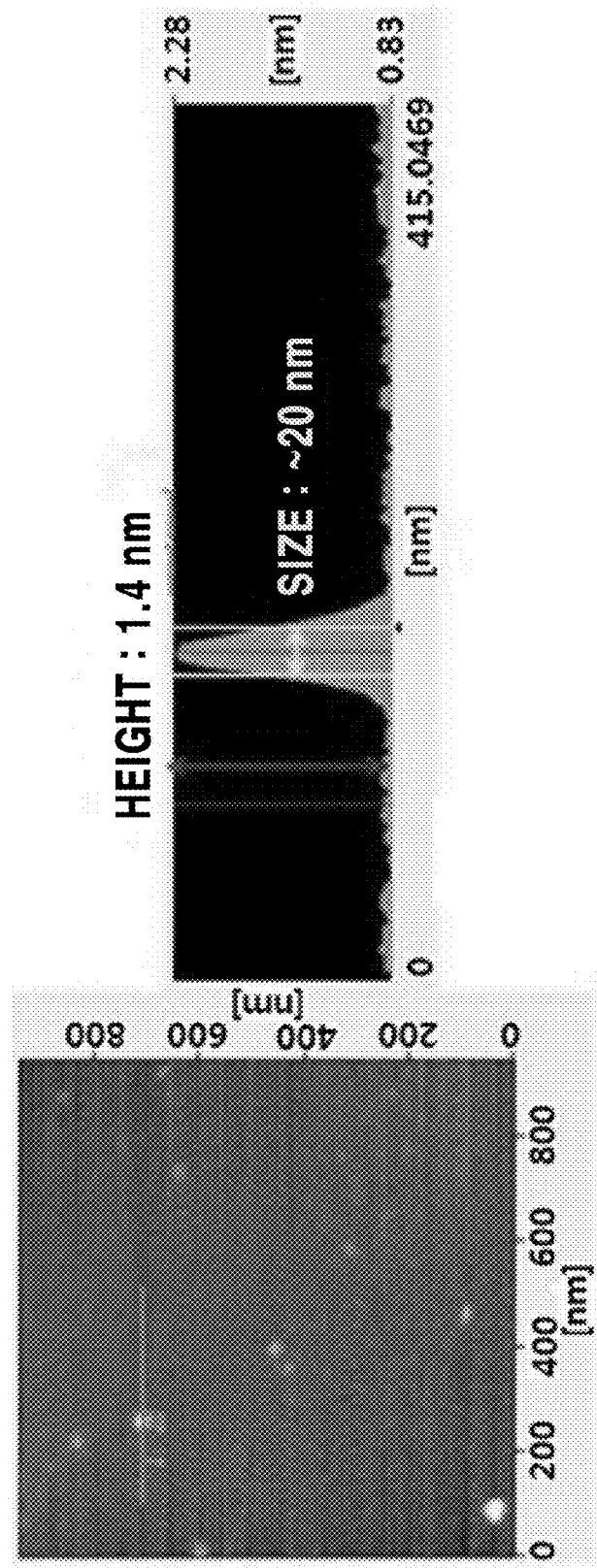
FIG. 8B is an atomic force microscopy (AFM) image and cross-sectional analysis of GQDs deposited on a mica substrate, in an Example of the present disclosure.
Figure 8C:
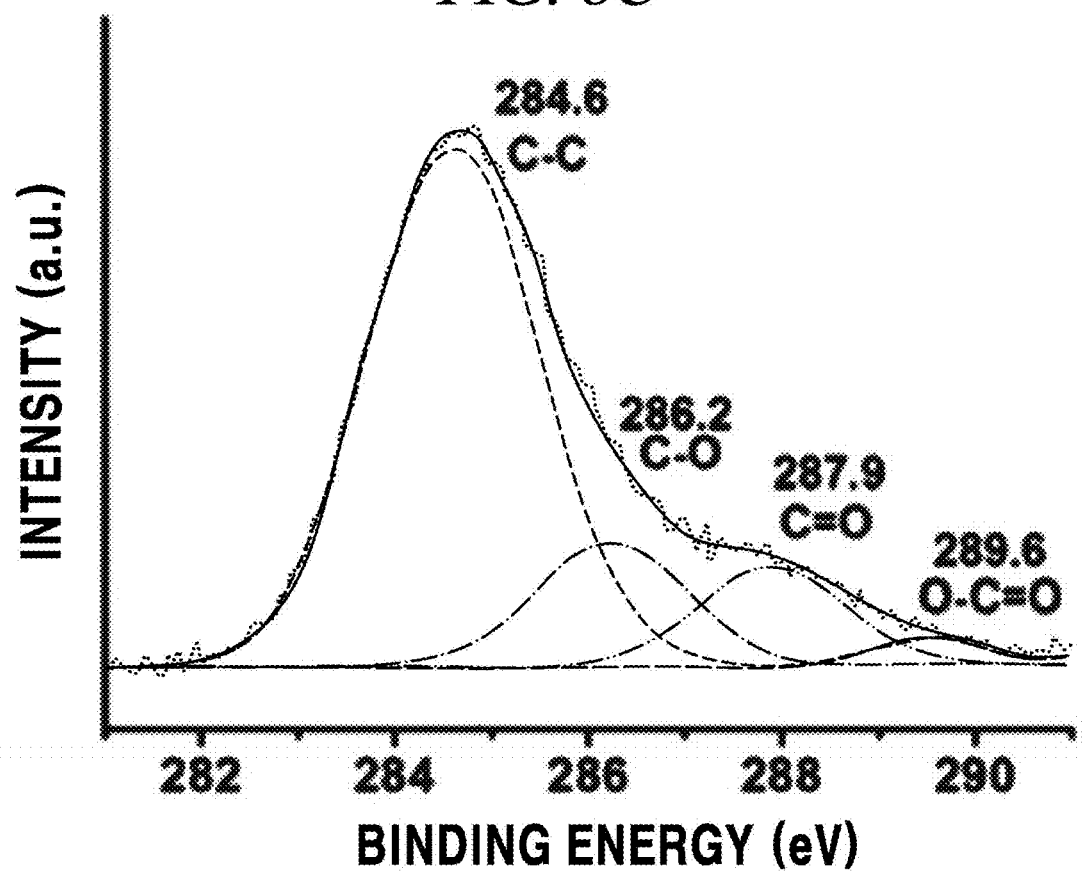
FIG. 8C is X-ray photoelectron spectroscopy (XPS) spectra of C1s for a GQD film on Si, in an Example of the present disclosure.
Figure 8D:
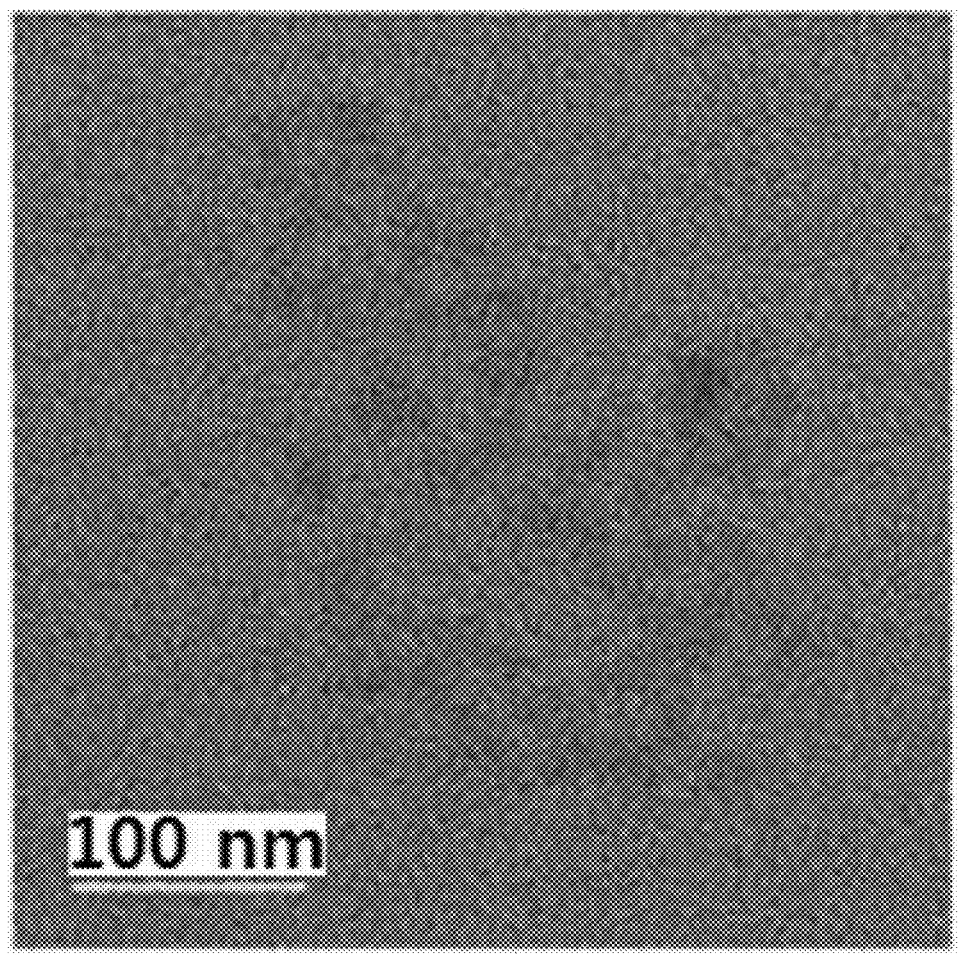
FIG. 8D is a high resolution transmission electron microscopy (TEM) image of GQDs, in an Example of the present disclosure.
Figure 9:
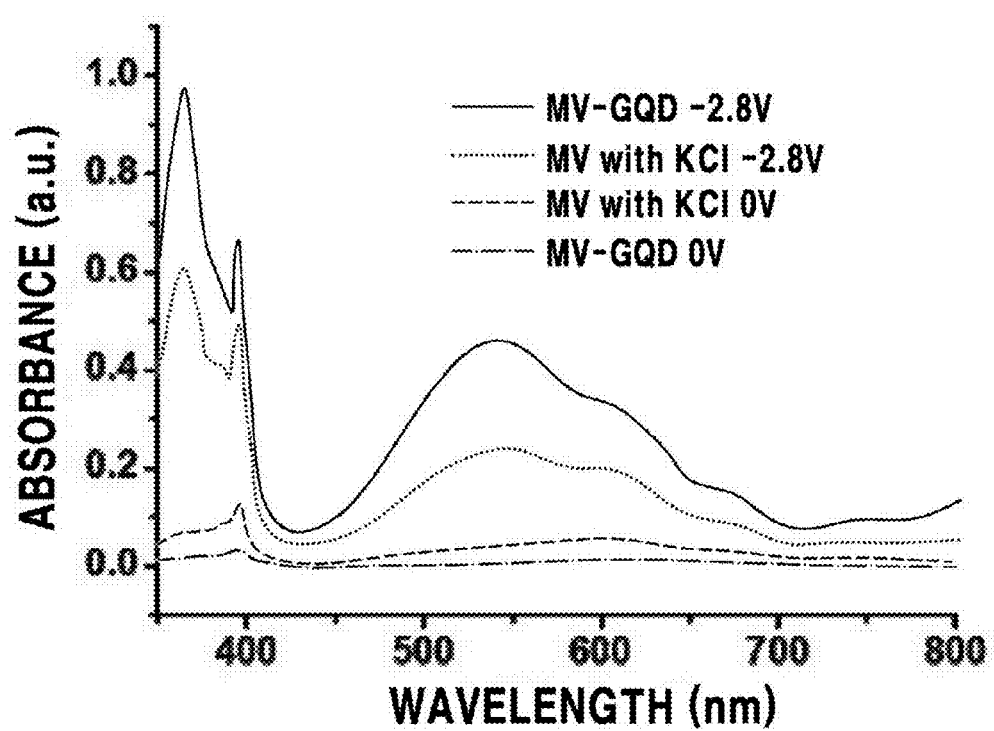
FIG. 9 shows changes in UV-vis absorption spectra of 50 mM $MV^{2+}$ and 0.1 M KCl in water and $MV^{2+}$ and 8 mg mL$^{-1}$ GQD in water, after the repeated electrochromic performances for approximately 3,000 s between 0 V and −2.8 V, and ECDs were composed of ITO/$MV^{2+}$-GQD@PVA or $MV^{2+}$-KCl@PVA/ITO, in an Example of the present disclosure.
Figure 16A:
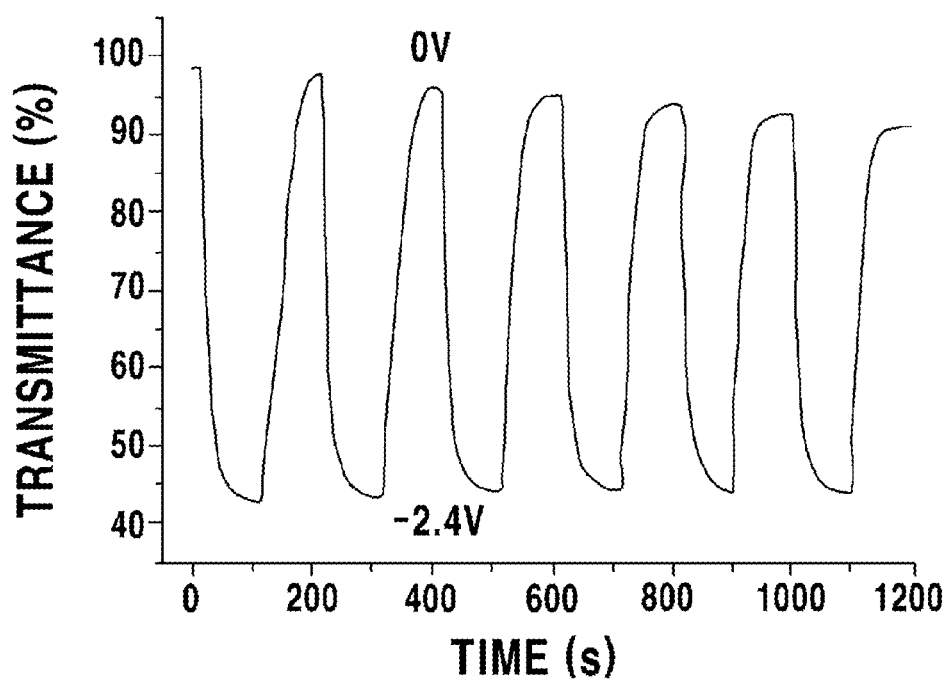
FIG. 16A is measurement of the coloring time of a flexible $MV^{2+}$-GQD ECD with an ITO-on-PET electrode, in an Example of the present disclosure.
Figure 16B:
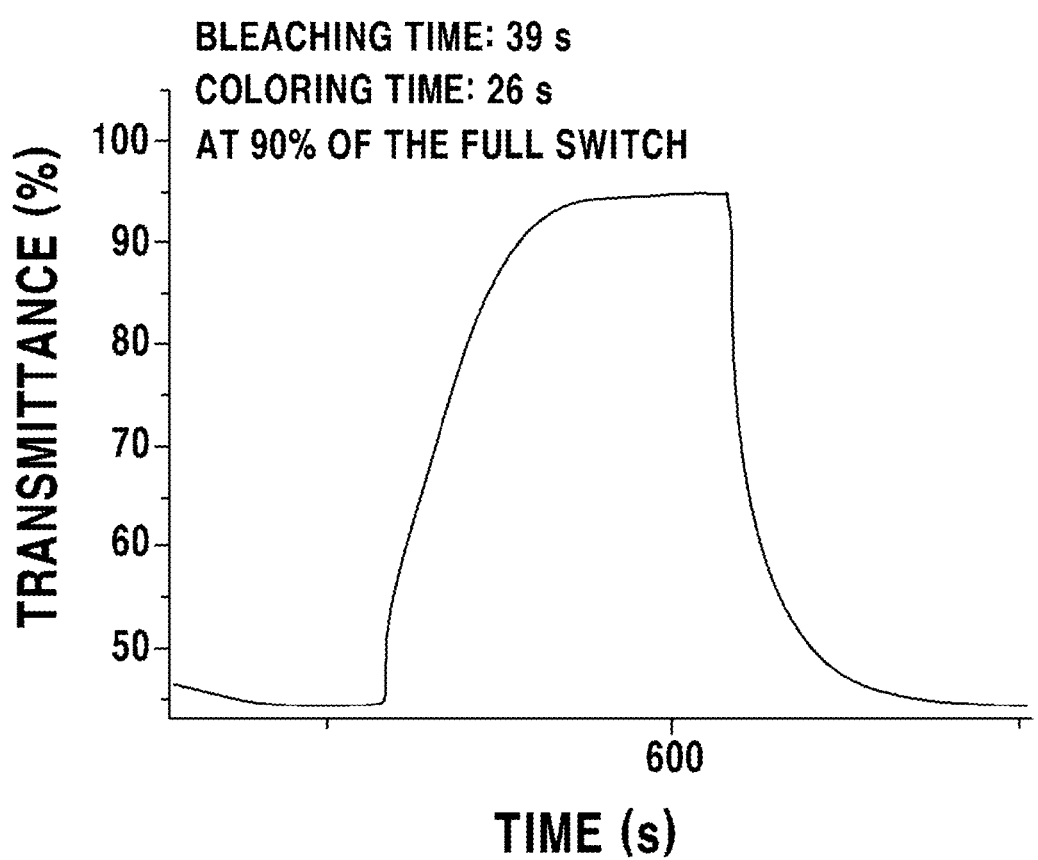
FIG. 16B is measurement of the bleaching time of a flexible $MV^{2+}$-GQD ECD with an ITO-on-PET electrode, in an Example of the present disclosure.
Figure 17A:
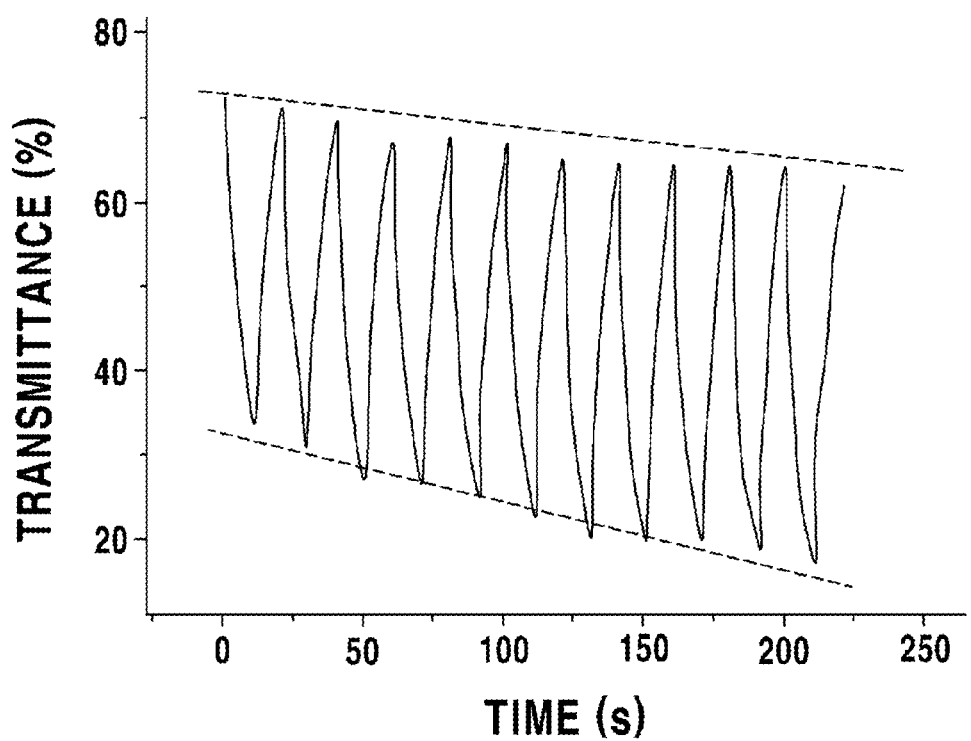
FIG. 17A shows voltage-controlled transmittance changes (at 550 nm) for preservation tests of the electrochromic performance of flexible $MV^{2+}$-GQD ECDs containing 50 mM $MV^{2+}$ and 8 mg mL$^{-1}$ GQD with 0.1 M KCl in PVA, for a flat device, in an Example of the present disclosure.
Figure 17B:
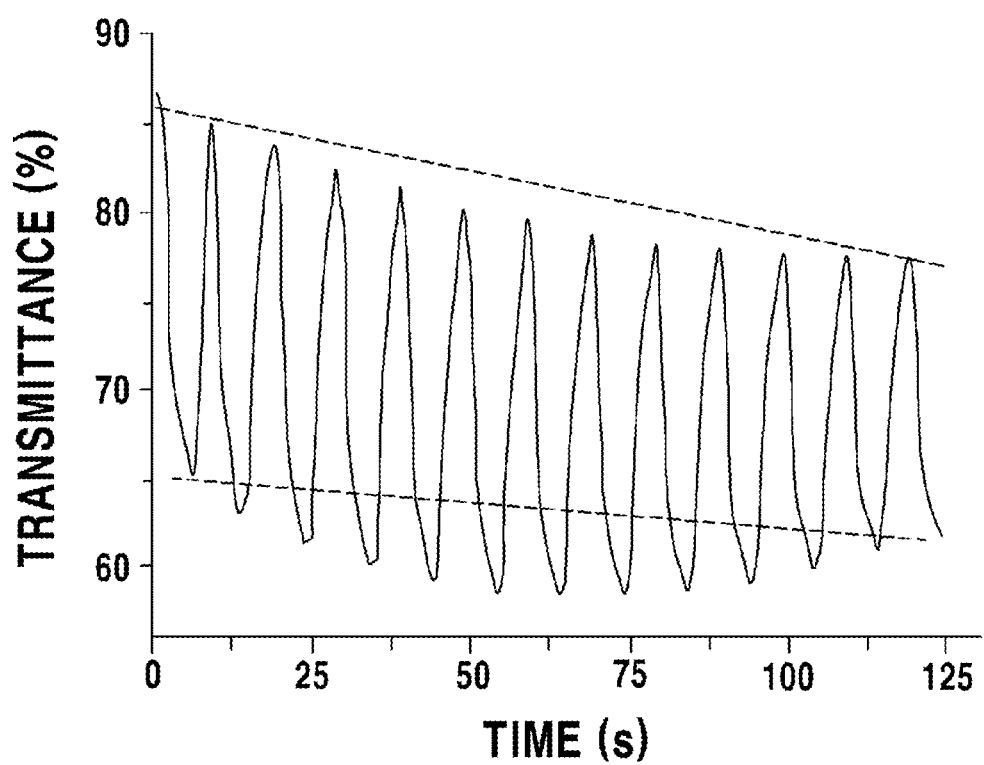
FIG. 17B shows voltage-controlled transmittance changes (at 550 nm) for preservation tests of the electrochromic performance of flexible $MV^{2+}$-GQD ECDs containing 50 mM $MV^{2+}$ and 8 mg ml$^{-1}$ GQD with 0.1 M KCl in PVA, for a bended device, in an Example of the present disclosure.

This Example successfully fabricated an electrolyte-free flexible ECD based on a substrate of ITO on polyethylene terephthalate (PET). The PET/ITO/$MV^{2+}$-GQD@PVA/ITO/PET device displayed reversible electrochromic performance between the bleached state at 0 V and the colored state at −2.8 V (FIG. 6). Even when the ECD was bent, its purple color was maintained, and its electrochromic performance remained good as the operational voltages were switched. In FIG. 16A and FIG. 16B, the inventors of the present disclosure calculated the coloring time (26 s at 90% of the full switch@−2.4 V) and the bleaching time (39 s at 90% of the full switch@−2.4 V) of $MV^{2+}$-GQD ECDs with an ITO-on-PET electrode using voltage steps with long durations for the devices completely switched to a coloring state and a bleaching state, which was sufficient to reveal the electrochromic property of the flexible $MV^{2+}$-GQD ECDs. Moreover, this Example conducted a bending test to examine the effects of bending on the colored and bleached states (FIG. 7A and FIG. 7B). Transmittance changes under a voltage control were performed with the flexible ECD in a flat state (FIG. 7A) and a bent state (FIG. 7B). The transmittance in each of the states of the flexible ECD was very stable under severe bending stress. The bent device showed some degradation in transmittance, as compared with that at the flat device, which could be attributed to a non-homogeneous concentration of gel-type $MV^{2+}$-GQD@PVA on entire electrode surfaces of ECDs under bending stress that is due to a weak attachment of $MV^{2+}$-GQD to the ITO-on-PET electrodes. But the bent device showed relatively good operational stability despite mechanical stress under the repeated application of voltage control, as compared with $MV^{2+}$-KCl ECDs with the ITO-on-PET electrodes. In this Example, it was believed that the non-covalent interactions (e.g., electrostatic interactions, $\pi$-$\pi$ stacking interactions, and cation-$\pi$ electron interactions) between the $MV^{2+}$ and GQDs caused them to form a homogeneous composition that stabilized the optical switching of the $MV^{2+}$. However, the measurement time of voltage-controlled transmittance changes strongly depended on electrochemical stability of the ITO-on-PET electrode. Even though the conductivity value of the ITO-on-PET electrode was comparable to an ITO-on-glass electrode, its electrochemical stability was not sustained in the measurement time longer than 3000 s as in FIG. 4A to FIG. 4D. On the other hand, a long-term performance of the ITO-on-PET electrode resulted in a separation of the ITO film from the PET substrate, which directly affected the stability of a long time operation of the flexible $MV^{2+}$-GQD ECD. It is highly expected that the flexible $MV^{2+}$-GQD ECD performance in the present Example should be improved over 3,000 times when a conducting electrode strongly adhesive on the flexible substrate is prepared in the near future. Furthermore, as a control to investigate the effect of using electrolyte in a $MV^{2+}$-GQD ECD, a flexible ECD device that used the $MV^{2+}$-GQD compound, in addition to KCl electrolyte, was fabricated (FIG. 17A and FIG. 17B). The PVA solution of $MV^{2+}$-GQD and KCl was mixed very well and placed between ITO-on-PET electrodes. This electrolyte-containing flexible ECD had unstable changes in transmittance between the colored state and the bleached state, showing operational fluctuation in both flat and bent devices under repeated application of the operating voltage, indicating that the use of an electrolyte did not aid the operational stability of $MV^{2+}$-GQD ECDs. Consequently, the present Example concluded that the performance of electrolyte-free flexible ECDs based on $MV^{2+}$-GQD was stabilized by the strong intermolecular interactions in the $MV^{2+}$-GQD nanocomposite.

In conclusion, the present Example has fabricated the first prototype electrolyte-free flexible electrochromic device using electrostatically strong $MV^{2+}$-GQD nanocomposites. This new carbon-based $MV^{2+}$-GQD ECD showed very stable switching performance, high durability under repeated application of operating voltage, and thermal stability to 80° C. The electrolyte-free flexible ECD based on $MV^{2+}$-GQD in the present Example has provided a promising direction in the development of flexible electrochromic displays.

The above description of the embodiments is provided for the purpose of illustration, and it would be understood by those skilled in the art that various changes and modifications may be made without changing technical conception and essential features of the example embodiments. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the embodiments. It shall be understood that all modifications and embodiments conceived from the meaning and scope of the claims and their equivalents are included in the scope of the inventive concept.

We claim:

1. An electrochromic device, comprising an active layer arranged between a first electrode and a second electrode;
    wherein the active layer includes a carbon-based material and a viologen-based compound,
    wherein the carbon-based material and the viologen-based compound are bonded to each other through a non-covalent interaction, and
    wherein the active layer does not include an electrolyte.

2. The electrochromic device of claim 1,
    wherein the carbon-based material includes a member selected from the group consisting of graphene, a graphene quantum dot, a graphene oxide, a reduced graphene oxide, a carbon nanotube (CNT), and combinations thereof.

3. The electrochromic device of claim 1,
    wherein the active layer further includes a polymer material that is dissolved in water or an organic solvent.

4. The electrochromic device of claim 3,
    wherein the polymer material includes a member selected from the group consisting of polyvinyl alcohol (PVA), polymethyl methacrylate (PMMA), polyvinyl chloride (PVC), polyethylene terephthalate (PET), polyethylene naphthalate (PEN), polyethersulfone (PES), polycarbonate (PC), polypropylene (PP), polyethylene (PE), ethylene vinyl alcohol (EVA), polyethylene oxide (PEO), polypropylene oxide (PPO), polyethyleneimine (PEI), polydimethylsiloxane (PDMS), polyvinylidene fluoride (PVDF), and combinations thereof.

5. The electrochromic device of claim 1,
    wherein the non-covalent interaction includes an electrostatic bonding, a π-π stacking bonding, or a cation-π bonding.

6. The electrochromic device of claim 1,
    wherein the electrochromic device has flexibility.

7. A flexible display, comprising the electrochromic device according to claim 1.

8. A smart window, comprising the electrochromic device according to claim 1.

9. An electrochromic mirror, comprising the electrochromic device according to claim 1.

10. A method for producing an electrochromic device, comprising:
    mixing a carbon-based material with a viologen-based compound to obtain an active layer material, and
    disposing the active layer material between a first electrode and a second electrode to form an active layer,
    wherein the active layer is formed by a non-covalent interaction between the carbon-based material and the viologen-based compound, and
    wherein the active layer does not include an electrolyte.

11. The method of claim 10,
    wherein the carbon-based material includes a member selected from the group consisting of graphene, a graphene quantum dot, a graphene oxide, a reduced graphene oxide, a carbon nanotube, and combinations thereof.

12. The method of claim 10,
    wherein the non-covalent interaction includes interaction by an electrostatic bonding, a π-π stacking bonding, or a cation-π bonding.

13. The method of claim 10,
    wherein the active layer is formed in a gel form.

* * * * *